US012677885B2

(12) United States Patent
Sebastian et al.

(10) Patent No.: US 12,677,885 B2
(45) Date of Patent: Jul. 14, 2026

(54) DISPENSER UNIT FOR AEROSOL PRECURSOR

(71) Applicant: RAI STRATEGIC HOLDINGS, INC., Winston-Salem, NC (US)

(72) Inventors: Andries Don Sebastian, Clemmons, NC (US); Charles Jacob Novak, III, Winston-Salem, NC (US); Alvaro Gonzalez-Parra, Advance, NC (US); Eugenia Theophilus, Clemmons, NC (US); Marielle Anitra Keyna Des Etages, Winston-Salem, NC (US); Joseph Dominique, Winston-Salem, NC (US); Wesley S. Jones, Lexington, NC (US); Bradley Phillips, Glen Iris (AU); Mark Dockrill, Chadstone (AU); Simon A. English, Croydon North (AU); Simon Philip Adam Higgins, Glen Iris (AU); Thomas Crugnale, Knoxfield (AU); Jeffrey Hughes, Tynong North (AU); Robert Neil, Wantirna South (AU); David Pritchard, Diamond Creek (AU)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 30 days.

(21) Appl. No.: 17/810,784

(22) Filed: Jul. 5, 2022

(65) Prior Publication Data

US 2022/0330621 A1 Oct. 20, 2022

Related U.S. Application Data

(62) Division of application No. 16/896,700, filed on Jun. 9, 2020, now Pat. No. 11,432,594, which is a division
(Continued)

(51) Int. Cl.
*A24F 47/00* (2020.01)
*A24F 15/015* (2020.01)
(Continued)

(52) U.S. Cl.
CPC .............. *A24F 47/00* (2013.01); *B01F 31/22* (2022.01); *B01F 31/50* (2022.01); *B01F 33/85* (2022.01);
(Continued)

(58) Field of Classification Search
CPC .. B65B 3/003; B65B 3/12; B65B 3/30; B65B 7/28; B65B 31/003; B65B 43/42;
(Continued)

(56) References Cited

U.S. PATENT DOCUMENTS

| | | | | |
|---|---|---|---|---|
| 2,193,059 A | | 3/1940 | Harold | |
| 3,817,416 A | * | 6/1974 | Costa .................. | B65D 55/089 222/153.07 |

(Continued)

FOREIGN PATENT DOCUMENTS

| | | | |
|---|---|---|---|
| CN | 2117327 U | | 9/1992 |
| CN | 101111870 A | | 1/2008 |

(Continued)

OTHER PUBLICATIONS

EPO, Extended European Search Report for EP Application No. 24167094.2, dated Mar. 3, 2025, p. 1-18.

*Primary Examiner* — Dariush Seif
(74) *Attorney, Agent, or Firm* — Womble Bond Dickinson (US) LLP; Chris Humphrey; John V. Forcier

(57) ABSTRACT

A unit for mixing and dispensing an aerosol precursor composition, and containers to be dispensed therefrom. The unit includes a plurality of bulk material filling stations, the plurality of bulk material filling stations have at least one first filling station with aerosol former and at least one
(Continued)

second filling station with a flavor material for creating the aerosol precursor. The unit also includes a bulk consumable pack staging a plurality of containers configured to receive the aerosol precursor, and a robot configured to retrieve a container from the bulk consumable pack and move the container through at least two dimensions to stop at at least two of the plurality of bulk material filling stations.

11 Claims, 21 Drawing Sheets

Related U.S. Application Data of application No. 15/422,545, filed on Feb. 2, 2017, now Pat. No. 10,759,554.

(51) Int. Cl.

| | |
|---|---|
| ***A24F 40/00*** | (2020.01) |
| ***B01F 31/22*** | (2022.01) |
| ***B01F 31/50*** | (2022.01) |
| ***B01F 33/85*** | (2022.01) |
| ***B65B 3/00*** | (2006.01) |
| ***B65B 3/12*** | (2006.01) |
| ***B65B 3/30*** | (2006.01) |
| ***B65B 7/28*** | (2006.01) |
| ***B65B 31/00*** | (2006.01) |
| ***B65B 43/42*** | (2006.01) |
| ***B65B 57/10*** | (2006.01) |
| ***B65D 1/02*** | (2006.01) |
| ***B65D 41/04*** | (2006.01) |
| ***B65D 47/12*** | (2006.01) |
| ***B65D 47/36*** | (2006.01) |
| ***B65D 50/00*** | (2006.01) |
| ***B65D 50/04*** | (2006.01) |
| ***B65D 51/18*** | (2006.01) |
| *A24F 40/10* | (2020.01) |

(52) U.S. Cl.

CPC ................ *B65B 3/003* (2013.01); *B65B 3/12* (2013.01); *B65B 3/30* (2013.01); *B65B 7/28* (2013.01); *B65B 31/003* (2013.01); *B65B 43/42* (2013.01); *B65B 57/10* (2013.01); *B65D 1/0246* (2013.01); *B65D 41/04* (2013.01); *B65D 47/12* (2013.01); *B65D 47/36* (2013.01); *B65D 50/00* (2013.01); *B65D 50/04* (2013.01); *B65D 50/048* (2013.01); *B65D 51/18* (2013.01); *A24F 15/015* (2020.01); *A24F 40/00* (2020.01); *A24F 40/10* (2020.01); *B65B 2210/04* (2013.01); *B65B 2220/14* (2013.01); *B65D 2251/0015* (2013.01); *B65D 2251/0046* (2013.01); *B65D 2251/0087* (2013.01)

(58) Field of Classification Search

CPC . B65B 57/10; B65B 2210/04; B65B 2220/14; B01F 31/22; B01F 31/50; B01F 33/85; B65D 1/0246; B65D 41/04; B65D 41/34–3495; B65D 47/12; B65D 47/36; B65D 50/00; B65D 50/04; B65D 50/048; B65D 51/18; B65D 2251/0015; B65D 2251/0046; B65D 2251/0087; A24F 40/10; A24F 40/00; A24F 15/015; A24F 47/00

USPC .......................................... 53/428, 468, 470

See application file for complete search history.

(56) References Cited

U.S. PATENT DOCUMENTS

| | | | | |
|---|---|---|---|---|
| 3,968,894 | A * | 7/1976 | Herrmann | B65D 41/3428 215/258 |
| 4,330,067 | A * | 5/1982 | Deussen | B65D 50/041 215/258 |
| 4,454,955 | A * | 6/1984 | Kusz | B65D 55/089 215/220 |
| 4,474,301 | A * | 10/1984 | Davis | B65D 41/3452 215/258 |
| 4,598,833 | A * | 7/1986 | Herr | B65D 41/3423 215/258 |
| 4,705,181 | A * | 11/1987 | Burke | B65D 47/06 215/44 |
| 4,782,644 | A | 11/1988 | Haarer et al. | |
| 4,940,167 | A * | 7/1990 | Fillmore | B65D 50/045 215/237 |
| 4,979,648 | A * | 12/1990 | Montgomery | B65D 50/045 222/525 |
| 5,033,647 | A * | 7/1991 | Smith | B05B 11/0072 222/212 |
| 5,133,169 | A | 7/1992 | Tesch, Jr. et al. | |
| 5,275,212 | A | 1/1994 | Moris | |
| 5,280,842 | A * | 1/1994 | Koo | B65D 50/041 215/220 |
| 5,372,148 | A | 12/1994 | McCafferty et al. | |
| 5,397,008 | A * | 3/1995 | Glynn | B65D 50/062 215/206 |
| 5,456,297 | A | 10/1995 | Crossdale et al. | |
| 5,529,210 | A | 6/1996 | Cooper, III | |
| 5,593,054 | A * | 1/1997 | Glynn | B65D 50/062 215/206 |
| 5,727,704 | A * | 3/1998 | Glynn | B65D 50/04 215/221 |
| 5,868,177 | A | 2/1999 | Leahy et al. | |
| 6,039,218 | A * | 3/2000 | Beck | B65D 41/3447 222/521 |
| 6,267,297 | B1 | 7/2001 | Contadini et al. | |
| 6,293,316 | B1 * | 9/2001 | Bertolotti | B65B 39/005 141/3 |
| 6,718,222 | B2 | 4/2004 | Bergo et al. | |
| 7,124,883 | B1 | 10/2006 | Thomas et al. | |
| 7,260,447 | B2 | 8/2007 | Osborne | |
| 7,565,818 | B2 | 7/2009 | Thomas et al. | |
| 7,591,398 | B2 * | 9/2009 | Pritikin | B65D 47/147 220/267 |
| 7,611,025 | B2 * | 11/2009 | Nusbaum | B65D 47/0842 215/253 |
| 7,661,560 | B2 * | 2/2010 | Murray | B65D 47/147 222/525 |
| 7,882,680 | B2 | 2/2011 | Siegel et al. | |
| 8,056,742 | B2 * | 11/2011 | Brozell | B65D 50/041 215/220 |
| 8,534,476 | B2 * | 9/2013 | Brozell | B65D 50/041 215/217 |
| 9,227,027 | B2 * | 1/2016 | Keenan | A61M 15/0026 |
| 9,445,631 | B1 | 9/2016 | Patel et al. | |
| 9,497,993 | B2 * | 11/2016 | Vallar | A24B 15/00 |
| 9,586,738 | B2 * | 3/2017 | Herrbach | B65D 50/041 |
| 9,630,753 | B2 * | 4/2017 | Ziegenhorn | B65D 49/12 |
| 9,669,974 | B2 * | 6/2017 | Wochele | B65D 51/1633 |
| 9,676,525 | B2 * | 6/2017 | Greiner-Perth | B65D 51/18 |
| 9,695,033 | B1 | 7/2017 | Alshouse et al. | |
| 9,707,562 | B2 | 7/2017 | Handique et al. | |
| 9,828,170 | B2 | 11/2017 | Nomura et al. | |
| 9,975,669 | B2 * | 5/2018 | Pellerin | B65D 47/0857 |
| 10,265,897 | B2 * | 4/2019 | Gehringer | B65D 41/0485 |
| 10,334,877 | B2 * | 7/2019 | Qiu | A24F 40/46 |
| 10,457,452 | B2 * | 10/2019 | Paganuzzi | B65D 50/041 |
| 2001/0002661 | A1 * | 6/2001 | Reidenbach | B65D 41/3447 215/252 |
| 2001/0052531 | A1 * | 12/2001 | Randall | B65D 47/0809 222/521 |
| 2003/0069667 | A1 | 4/2003 | Dirksing et al. | |

(56) References Cited

U.S. PATENT DOCUMENTS

2004/0060598 A1* 4/2004 Danby ............... A47G 19/2266 137/508
2004/0189311 A1 9/2004 Glezer et al.
2005/0016550 A1 1/2005 Katase
2005/0121477 A1* 6/2005 Scott .................... B65D 51/226 222/522
2005/0178465 A1* 8/2005 Desjardins ................ B65B 3/12 141/20
2005/0189313 A1* 9/2005 Walters, Jr. .......... B65D 47/127 215/305
2005/0269367 A1 12/2005 Post
2006/0037968 A1* 2/2006 Brenner ............... B65D 83/771 222/105
2006/0118435 A1* 6/2006 Cronin ................. B65D 47/243 206/219
2006/0231519 A1* 10/2006 Py .......................... B65D 51/18 220/259.3
2007/0163574 A1 7/2007 Rohrschneider et al.
2007/0175908 A1 8/2007 Siri
2007/0224055 A1 9/2007 Anex et al.
2008/0011704 A1* 1/2008 Van Ryn ................ B65D 55/02 215/254
2008/0053560 A1 3/2008 Hartman et al.
2008/0073348 A1* 3/2008 Pritikin ................ B65D 47/147 222/1
2008/0169261 A1* 7/2008 Druitt ................ B65D 47/0809 215/253
2008/0206751 A1* 8/2008 Squirrell ................... B03C 1/01 435/6.1
2009/0242561 A1* 10/2009 Wellman ............ B65D 51/2857 215/364
2009/0308832 A1* 12/2009 Von Spreckelsen ........................ B65D 47/0804 215/316
2011/0036346 A1* 2/2011 Cohen ..................... A24F 40/60 128/200.14
2011/0163119 A1* 7/2011 Nyambi ............. B65D 51/2835 222/562
2011/0226816 A1* 9/2011 Alluigi ................... B65D 50/04 222/401
2012/0018034 A1 1/2012 Bertoli et al.
2012/0018318 A1* 1/2012 Otsuka .................. A61J 1/1418 206/216
2012/0048266 A1 3/2012 Alelov
2012/0152406 A1* 6/2012 Bartholomew ........... B65B 3/04 141/104
2012/0167906 A1 7/2012 Gysland
2012/0247613 A1 10/2012 Behbehani
2013/0111849 A1 5/2013 Bush et al.
2013/0146489 A1 6/2013 Scatterday
2013/0158704 A1 6/2013 Hughes et al.
2013/0214004 A1* 8/2013 Dejonge .............. B65D 50/061 220/345.3
2013/0221015 A1* 8/2013 Schmidt .............. B29C 45/0003 264/250
2013/0255831 A1* 10/2013 Shibasaki ............. B01F 33/846 141/69
2013/0338821 A1 12/2013 Igarashi
2013/0340390 A1 12/2013 Carson et al.
2014/0007836 A1 1/2014 Miyajima et al.
2014/0203063 A1 7/2014 Hessler et al.
2014/0263456 A1* 9/2014 Barber ................ B05B 11/0032 222/153.13
2014/0270727 A1 9/2014 Ampolini et al.
2014/0283946 A1* 9/2014 Kribs ..................... B65D 47/06 141/2
2014/0290181 A1* 10/2014 Edwards ............... B65B 7/2835 53/111 R
2015/0027436 A1 1/2015 Mine et al.
2015/0028815 A1 1/2015 Osawa et al.
2015/0040568 A1 2/2015 Stastny et al.
2015/0102062 A1 4/2015 Mosimann et al.
2015/0166253 A1* 6/2015 Nomura ................ B65B 7/2857 222/394
2015/0191266 A1 7/2015 Holmes et al.
2015/0223522 A1 8/2015 Ampolini et al.
2015/0264319 A1 9/2015 Wood et al.
2015/0336689 A1 11/2015 Brown et al.
2015/0336716 A1* 11/2015 Gehringer ........... B29C 45/1676 215/316
2016/0054345 A1 2/2016 Watson et al.
2016/0143361 A1* 5/2016 Juster ................... H05B 1/0244 392/404
2016/0167826 A1* 6/2016 Scott .................... B65D 1/0223 222/182
2016/0200463 A1 7/2016 Hodges et al.
2016/0236832 A1* 8/2016 Painchaud ............ A61J 1/1425
2016/0325858 A1* 11/2016 Ampolini .............. B65B 59/001
2016/0331024 A1 11/2016 Cameron
2016/0338408 A1 11/2016 Guenther, Jr. et al.
2017/0000191 A1 1/2017 Medina Rivero
2017/0035183 A1 2/2017 Faverio
2017/0121169 A1* 5/2017 Dailey .................. B65B 57/145
2017/0282139 A1 10/2017 Bartholomew et al.
2018/0009582 A1* 1/2018 Dejonge ................ B65D 47/06
2018/0111713 A1* 4/2018 Ibarreche Fonseca .. B65D 1/08
2018/0170588 A1 6/2018 Boldrini
2018/0215488 A1 8/2018 Sebastian et al.
2018/0362226 A1* 12/2018 Philip .................... B65D 47/18
2019/0174829 A1 6/2019 Guenther, Jr. et al.
2022/0330621 A1* 10/2022 Sebastian .............. B65B 31/003

FOREIGN PATENT DOCUMENTS

| | | | |
|---|---|---|---|
| CN | 106232480 | A | 12/2016 |
| DE | 202014105654 | U1 | 12/2015 |
| EP | 3023947 | A1 | 5/2016 |
| GB | 2296911 | A | 7/1996 |
| GB | 2497536 | A | 6/2013 |
| JP | 2000296806 | A | 10/2000 |
| JP | 2002087457 | A | 3/2002 |
| JP | 2003014349 | A | 1/2003 |
| JP | 2005350096 | A | 12/2005 |
| JP | 2006204487 | A | 8/2006 |
| JP | 2008279367 | A | 11/2008 |
| JP | 2013180067 | A | 9/2013 |
| JP | 2013203440 | A | 10/2013 |
| JP | 2014028445 | A | 2/2014 |
| UA | 91373 | C2 | 7/2010 |
| WO | WO-2006052863 | A1 | 5/2006 |
| WO | WO-2015028815 | A1 | 3/2015 |
| WO | WO-2016179155 | A2 | 11/2016 |
| WO | WO-2016187695 | A1 | 12/2016 |

* cited by examiner

DISPENSER UNIT FOR AEROSOL PRECURSOR

CROSS-REFERENCE TO RELATED APPLICATIONS

This application is a divisional of U.S. application Ser. No. 16/896,700, filed Jun. 9, 2020, which is a divisional of U.S. application Ser. No. 15/422,545, filed Feb. 2, 2017, the entire disclosures of which are hereby incorporated by reference herein in their entireties.

FIELD OF INVENTION

The present disclosure relates to custom aerosol precursor compositions and a machine configured to dispense containers having aerosol precursor. The present disclosure also relates to the containers for receiving the aerosol precursor within the machine. The aerosol precursor may be of the type that incorporates materials that may be made or derived from tobacco or otherwise incorporate tobacco. The precursor is intended to be capable of forming an inhalable substance for human consumption when in-use with an aerosol delivery device, such as smoking articles. Smoking articles may be the type that utilizes electrically generated heat for the production of the inhalable substance.

BACKGROUND

Many smoking devices have been proposed through the years as improvements upon, or alternatives to, smoking products that require combusting tobacco for use. Many of those devices purportedly have been designed to provide the sensations associated with cigarette, cigar or pipe smoking, but without delivering considerable quantities of incomplete combustion and pyrolysis products that result from the burning of tobacco. To this end, there have been proposed numerous smoking products, flavor generators and medicinal inhalers that utilize electrical energy to vaporize or heat a volatile material, or attempt to provide the sensations of cigarette, cigar or pipe smoking without burning tobacco to a significant degree. See, for example, the various alternative smoking articles, aerosol delivery devices and heat generating sources set forth in the background art described in U.S. Pat. No. 7,726,320 to Robinson et al. and U.S. Pat. No. 8,881,737 to Collett et al., which are incorporated herein by reference. See also, for example, the various types of smoking articles, aerosol delivery devices and electrically-powered heat generating sources referenced by brand name and commercial source in U.S. Pat. Pub. No. 2015/0216232 to Bless et al., which is incorporated herein by reference. Additionally, various types of electrically powered aerosol and vapor delivery devices also have been proposed in U.S. Pat. Pub. Nos. 2014/0096781 to Sears et al. and 2014/0283859 to Minskoff et al., as well as U.S. patent application Ser. No. 14/282,768 to Sears et al., filed May 20, 2014; Ser. No. 14/286,552 to Brinkley et al., filed May 23, 2014; Ser. No. 14/327,776 to Ampolini et al., filed Jul. 10, 2014; and Ser. No. 14/465,167 to Worm et al., filed Aug. 21, 2014; all of which are incorporated herein by reference.

Some of these alternative smoking articles, i.e. aerosol delivery devices, are reusable by employing replaceable cartridges or refillable tanks of aerosol precursor (e.g. smoke juice, e-liquid, or e-juice). It would be desirable to provide for a personalizeable selection of aerosol precursor for use with these alternative smoking articles. Thus, advances with respect to creating, mixing, and dispensing of aerosol precursor would be desirable.

SUMMARY

The present disclosure provides a unit for mixing and dispensing an aerosol precursor composition for use by an aerosol delivery device, such as an e-cigarette. The aerosol precursor dispensed from the unit is generally customizable to the customer's preference of flavor and/or strength. The mixing and dispensing unit may be configured to dispense the composition in the form of filled or partially filled containers which may hold the aerosol precursor composition until it is provided into a reservoir of an aerosol delivery device. The containers may be specially designed to have at least one of a child resistant and a tamper evident feature. Methods of using the mixing and dispensing units as well as methods of using the containers are also described.

In one embodiment, the present disclosure includes a unit for mixing and dispensing an aerosol precursor composition. The unit comprises a plurality of bulk material filling stations, the plurality of bulk material filling stations comprising at least one first filling station having aerosol former and at least one second filling station having a flavor material for creating the aerosol precursor. The unit further comprises a bulk consumable pack staging a plurality of containers configured to receive the aerosol precursor. The unit further comprises a robot configured to retrieve a container from the bulk consumable pack and move the container through at least two dimensions to stop at at least two of the plurality of bulk material filling stations.

The mixing and dispensing unit described above may further include one or more of the features from the following statements individually and in combinations and permutations thereof.

The unit further comprising a capping station configured to remove a cap from the container prior to filling the container at at least two of the plurality of bulk material filling stations. The capping station may also be configured to attach the cap after at least partially filling the container with the aerosol precursor.

The unit may further comprise a testing station configured to measure an amount of the aerosol precursor within the container.

The unit may further comprise a labeling station configured to provide indicia based upon the flavor material. The labeling station may provide indicia by applying a web to the container. The labeling station may comprise a print head for forming the indicia.

Each bulk material filling station of the unit may comprise a pump. The pump may be integrated with a reservoir to form a bulk material pack that is removable from the bulk material filling station. The pump may comprise a staging chamber in communication with the reservoir, the staging chamber configured to hold a measured dose of the respective bulk material. An RFID antenna may be attached to a stage of the robot, the RFID antenna configured to read an RFID tag on the bulk material pack. The pump may be configured to dispense a measured dose of the respective bulk material with each activation of the pump. The pump may be activated by being pressed by a portion of the robot or the container.

The unit may use containers comprising a child resistant feature and a tamper evident feature. Each container may comprise a bottle having a storage volume for holding the aerosol precursor and a cap. The cap may comprise a nozzle, an inner cover comprising a tamper evident band, and an outer cover provided over the inner cover. The outer cover creates the child resistant feature limiting an ability to remove the inner cover from the bottle. In a first state, the nozzle, inner cover, and outer cover are simultaneously removable from the bottle. In a second state, the nozzle is substantially permanently fixed to the bottle. Further, the bottle may have a neck comprising external threads. The nozzle may be configured to at least partially fit within the neck, the nozzle having an aperture for dispensing the aerosol precursor from the bottle. The inner cover may further comprise internal threads for engagement with the external threads of the neck and the tamper evident band may be positioned within an interior of the inner cover. In the first state, the cap may be engaged with the bottle such that the nozzle is inserted into the neck by a first insertion distance I1, and the inner cover is threadingly engaged with the neck by a first thread distance T1. In the second state, the cap may be engaged with the bottle such that the nozzle is inserted into the neck by a second insertion distance I2, I2 being greater than I1, and the inner cover is threadingly engaged with the neck by a second thread distance T2, T2 being greater than T1. In a third state, the nozzle may be inserted into the neck by the second insertion distance I2, and the inner cover is not threadingly engaged with the neck such that the aerosol precursor within the bottle can be dispensed through the aperture of the nozzle. In a fourth state, the cap is removed from the bottle to allow for at least partially filling the storage volume with the aerosol precursor.

The nozzle may further comprise a detent to snap fit into the inner cover such that the nozzle is removed from the bottle with the inner cover. The neck of the bottle may further comprise a radial flange, and in the first state, the tamper evident band is not activated, and in the second state, the tamper evident band is activated by being positioned below the radial flange, such that when the inner cover is removed to achieve the third state, the band is damaged as the band passes the radial flange. The tamper evident band may press against the radial flange in the first state. In the second state, the inner cover may abut a bottle alignment stop formed on the neck, wherein the bottle alignment stop facilitates alignment of side walls of the bottle with side wall of the cap in the second state if the respective side walls are not cylindrical.

In one embodiment, the storage volume of the bottle is at least about 5 ml and preferably at least about 15 ml.

The mixing and dispensing unit may also comprise a plurality of second bulk material filling stations, each having a bulk material selected from one of nicotine, menthol, fruit flavors, floral flavors, and savory flavors. The robot may comprise a container holder, a first dimension guide and a second dimension guide. A user interface may be configured to receive selection information that dictates at which of the plurality of bulk material stations the robot will stop. A controller having a processor may be provided for controlling the robot to stop at the desired bulk material filling stations and dispense the desired amount of bulk material from each bulk material filling station.

In other embodiments, the present disclosure presents automated methods of making a custom composition of an aerosol precursor. The method according to one embodiment comprises retrieving a container with a robot, dispensing, at a first location, an aerosol former into the container with a first pump, moving the container to a second location with the robot, dispensing at least one flavor material into the container at the second location with a second pump, capping the container, and mixing the aerosol former with the at least one flavor material.

Methods of making a custom composition of an aerosol precursor may include one or more of the following optional features individually or in combinations thereof.

The step of retrieving the container may comprise pulling, using suction, the container from a bulk consumable pack comprising a plurality of empty containers.

The step of dispensing the liquid aerosol former may comprise activating the first pump integrated with a reservoir for the liquid aerosol former. Activating the first pump may comprise pressing substantially vertically upward upon a portion of the first pump. The act of pressing may comprise contacting a container holder with the portion of the first pump, the container holder having a bottle of the container held therein, and lifting the container holder relative to the first pump. Activating the first pump may also result in displacing a drip guard on the first pump with the container holder.

The step of capping the container may comprise attaching a cap to a bottle. The method may further comprise removing the cap from the bottle prior to dispensing the liquid aerosol former into the container. The step of removing the cap may comprise retaining the cap and rotating the cap relative to the bottle.

The step of mixing may comprise moving the container along a plane in a spiral pattern and/or rotating the container about an axis passing through the container using the same robot. Mixing may further comprise translating the container out of the plane.

The methods of making may also include measuring an amount of the aerosol precursor within the container. Measuring the amount of aerosol precursor may comprise using a distance meter to measure a distance between the meter and a surface of the aerosol precursor. The methods may involve moving the container to a waste bin if the amount of aerosol precursor is outside a pre-determined range.

The methods of making may also include labeling the container. Labeling the container may comprise adding a film onto the container. Labeling may further comprise printing information onto the film. Labeling the container may comprise printing information onto the container.

The methods of making may also include verifying the at least one flavor material prior to dispensing the at least one flavor material into the container, wherein the step of verifying comprises using RFID.

Additional embodiments of the present disclosure provide for a child resistant, tamper evident container. The container comprises a bottle having a storage volume for holding liquid contents and a cap. The cap comprises a nozzle, an inner cover, comprising a tamper evident band, and an outer cover provided over the inner cover, wherein the outer cover creates a child resistant feature limiting an ability to remove the inner cover from the bottle. In a first state, the nozzle, inner cover, and outer cover are simultaneously removable from the bottle. In a second state, the nozzle is substantially permanently fixed to the bottle.

Embodiments of the child resistant, tamper evident container may optionally further comprise one or more of the following features individually or in the various combinations thereof. The bottle may have a neck comprising external threads. The nozzle may be configured to at least partially fit within the neck, and the nozzle has an aperture for dispensing the liquid contents from the bottle. The inner cover may further comprise internal threads for engagement with the external threads of the neck, and the tamper evident band may be positioned within an interior of the inner cover. In the first state, the cap may be engaged with the bottle such that the nozzle is inserted into the neck by a first insertion distance I1, and the inner cover is threadingly engaged with the neck by a first thread distance T1. In the second state, the cap may be engaged with the bottle such that the nozzle is inserted into the neck by a second insertion distance I2, I2 being greater than I1, and the inner cover is threadingly engaged with the neck by a second thread distance T2, T2 being greater than T1. In a third state, the nozzle may be inserted into the neck by the second insertion distance I2, and the inner cover is not threadingly engaged with the neck such that the liquid contents of the bottle can be dispensed through the aperture of the nozzle. In a fourth state, the cap is removed from the bottle to allow for at least partially filling the storage volume with the liquid contents.

The nozzle may comprise a detent to snap fit into the inner cover such that the nozzle is removed from the bottle with the inner cover. The neck may further comprise a radial flange. In the first state, the tamper evident band is not activated. In the second state, the tamper evident band is activated by being positioned below the radial flange, such that when the inner cover is removed to achieve the third state, the band is damaged as the band passes the radial flange. The tamper evident band may press against the radial flange in the first state.

In the second state, the inner cover may abut a bottle alignment stop formed on the neck, wherein the alignment stop facilitates alignment of side walls of the bottle with side wall of the cap in the second state if the respective side walls are not cylindrical.

The storage volume of the bottle may be at least about 5 ml and preferably at least about 15 ml.

Yet other embodiments of the present disclosure include methods of filling a container with an aerosol precursor. One such method comprises separating a cap from a bottle with a machine, the cap comprising a nozzle, an inner cover and an outer cover. The method further comprises at least partially filling a storage volume of the bottle with the aerosol precursor from a plurality of filling stations, each station comprising a liquid component of the aerosol precursor, and attaching the cap to the bottle such that the nozzle is substantially permanently fixed to the bottle and a tamper evident band formed with the inner cover is activated below a radial flange extending from a neck of the bottle.

Methods of filling the container may also include one or more of the following features and elements individually or in their various combinations. The step of separating the cap from the bottle may at least comprise rotating the cap relative to the bottle. Separating the cap from the bottle may also comprise at least one of pressing and squeezing the outer cover relative to the inner cover. Separating the cap from the bottle may comprise simultaneously removing the nozzle, the inner cover and the outer cover from the bottle.

The step of attaching the cap to the bottle may comprise rotating the cap relative to the bottle.

Methods of filling the container may also include rotating the cap relative to the bottle until a bottle alignment stop abuts a cap alignment stop.

The step of at least partially filling the storage volume may comprise dispensing, at a first location, a liquid aerosol former into the container with a first pump, moving the container to a second location with a robot, and dispensing at least one liquid flavor material into the container at the second location with a second pump. Dispensing the liquid aerosol former may comprise activating the first pump integrated with a reservoir for the liquid aerosol former. Activating the first pump may comprise pressing substantially vertically upward upon a portion of the first pump. The act of pressing may comprise contacting a container holder with the portion of the first pump, the container holder having the bottle of the container held therein, and lifting the container holder relative to the first pump.

Methods of filling the container may also include verifying the at least one liquid flavor material prior to dispensing the at least one liquid flavor material into the container, wherein the step of verifying comprises using RFID. Methods of filling the container may also include moving the container along a plane in a spiral pattern to mix the aerosol precursor liquid. Additional steps may also include measuring an amount of the aerosol precursor within the container and moving the container to a waste bin if the amount of aerosol precursor is outside a pre-determined range.

BRIEF DESCRIPTION OF THE DRAWINGS

Figure 1:
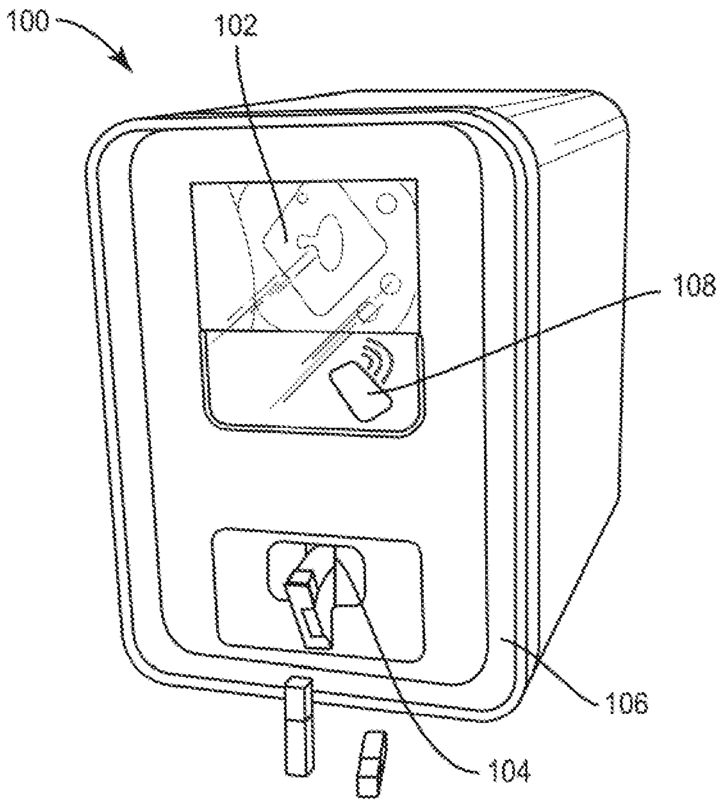

Having thus described the disclosure in the foregoing general terms, reference will now be made to the accompanying drawings, which are not necessarily drawn to scale, and wherein:

FIG. 1 shows an exterior view of a dispenser unit according to embodiments of the present disclosure.

Figure 2:
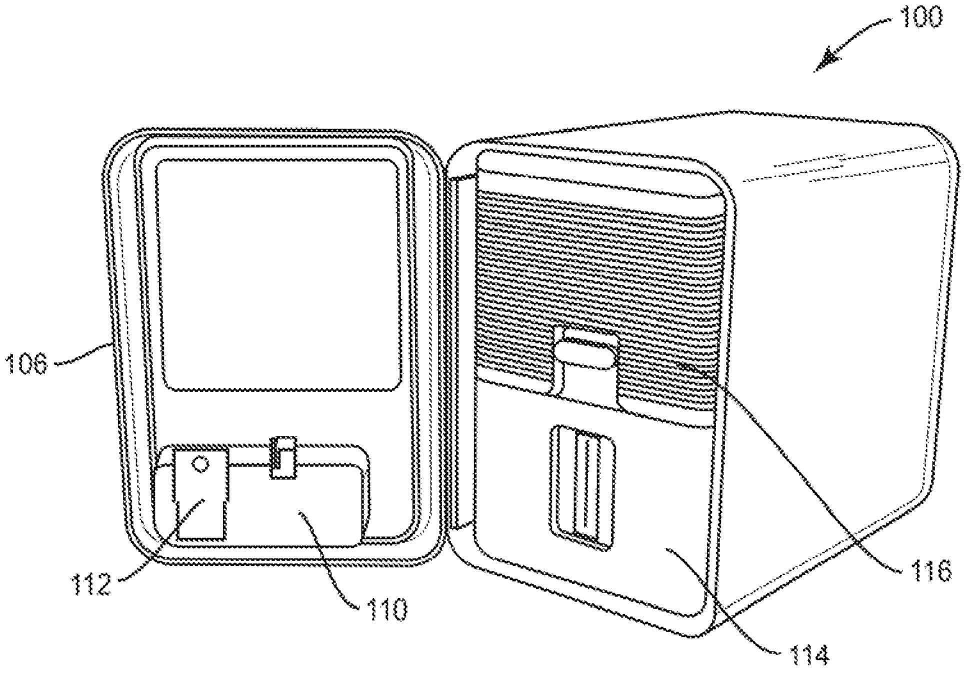

FIG. 2 shows the dispenser unit with an open cover.

Figure 3:
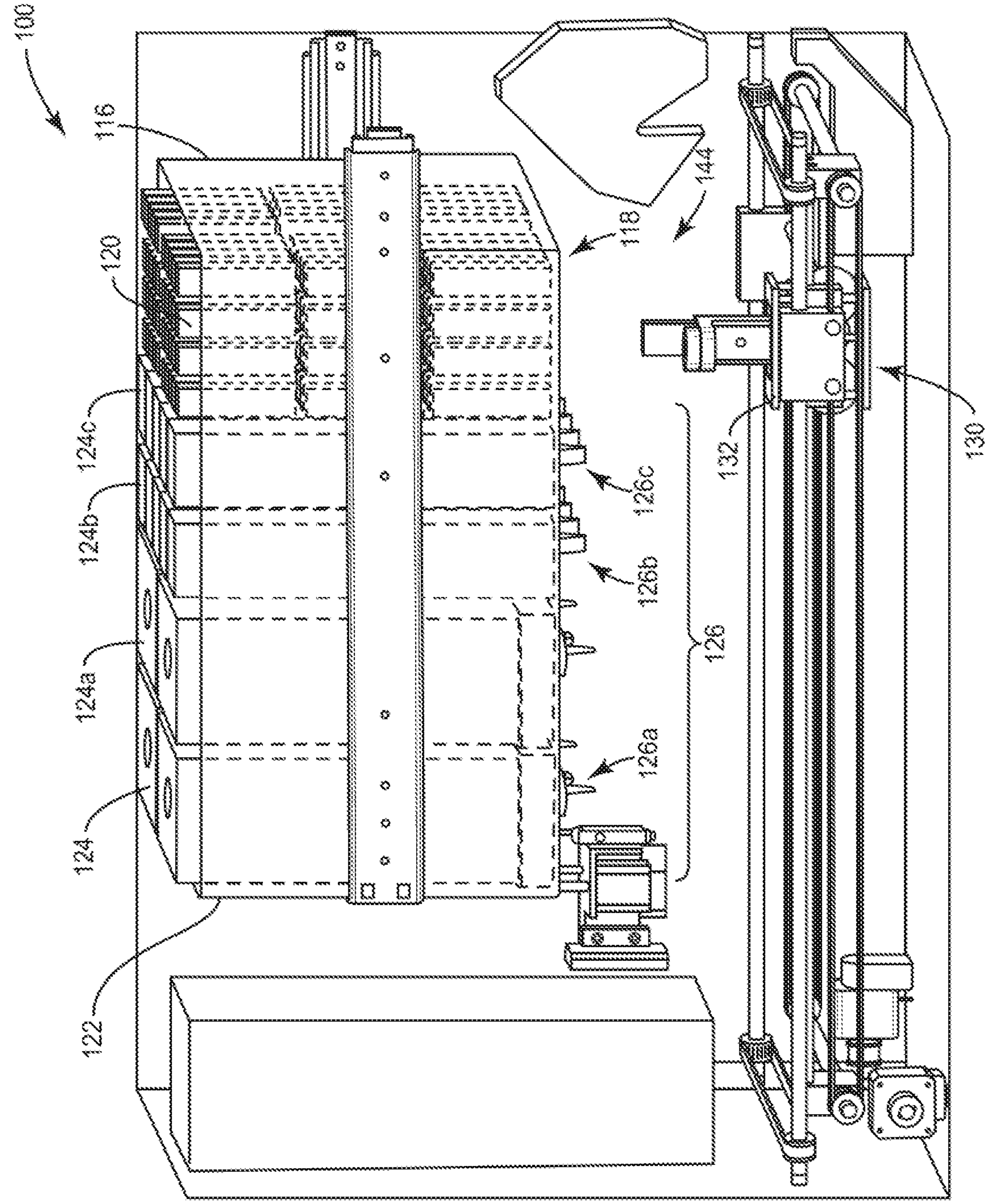

FIG. 3 is an interior cut-away of the dispenser unit according to embodiments of the present disclosure.

Figure 4:
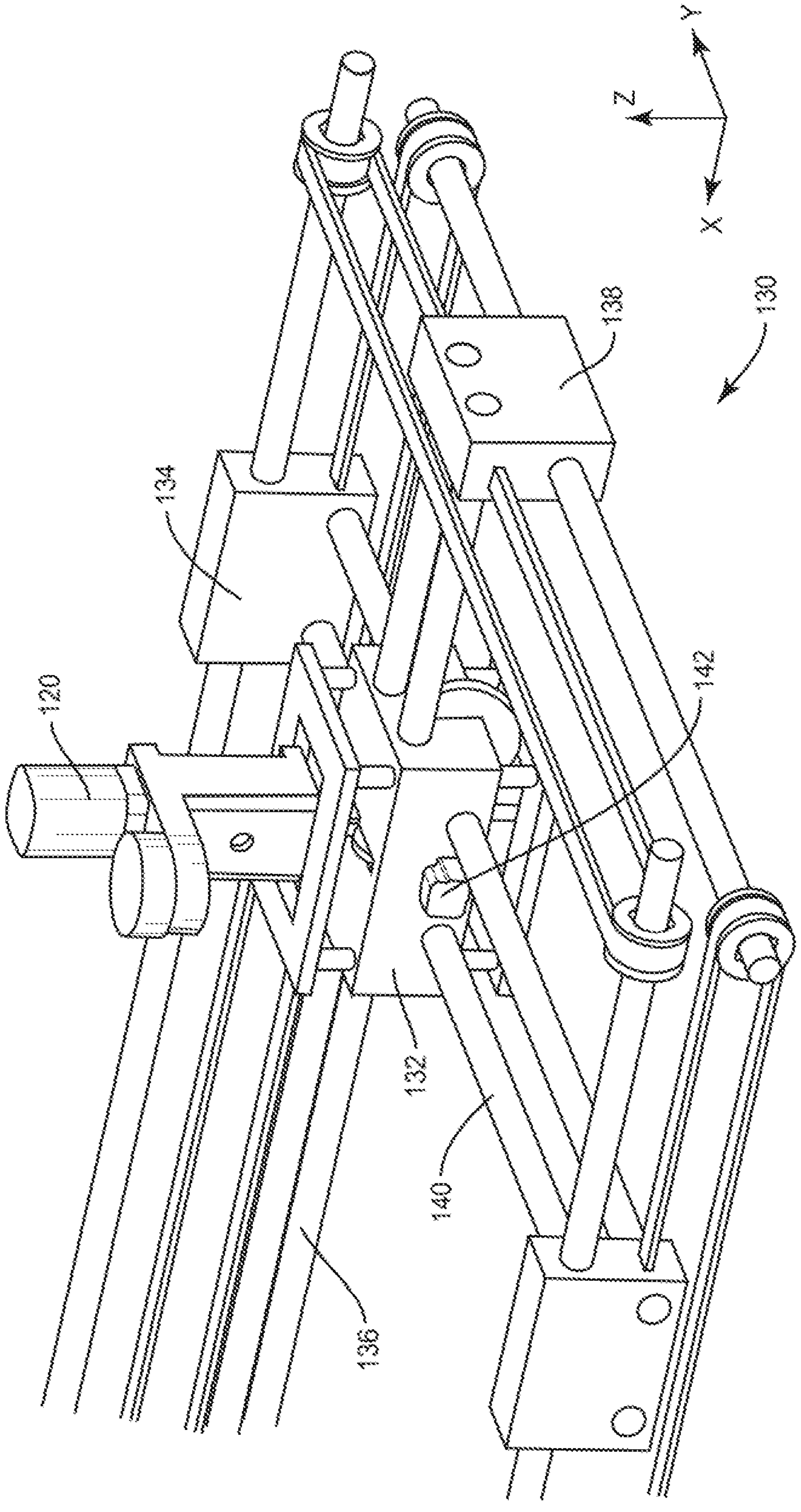

FIG. 4 is a detailed view of a robot according to embodiments of the present disclosure used within the dispenser unit.

FIGS. 5A-5E show a series of steps to retrieve a container.

Figure 6:
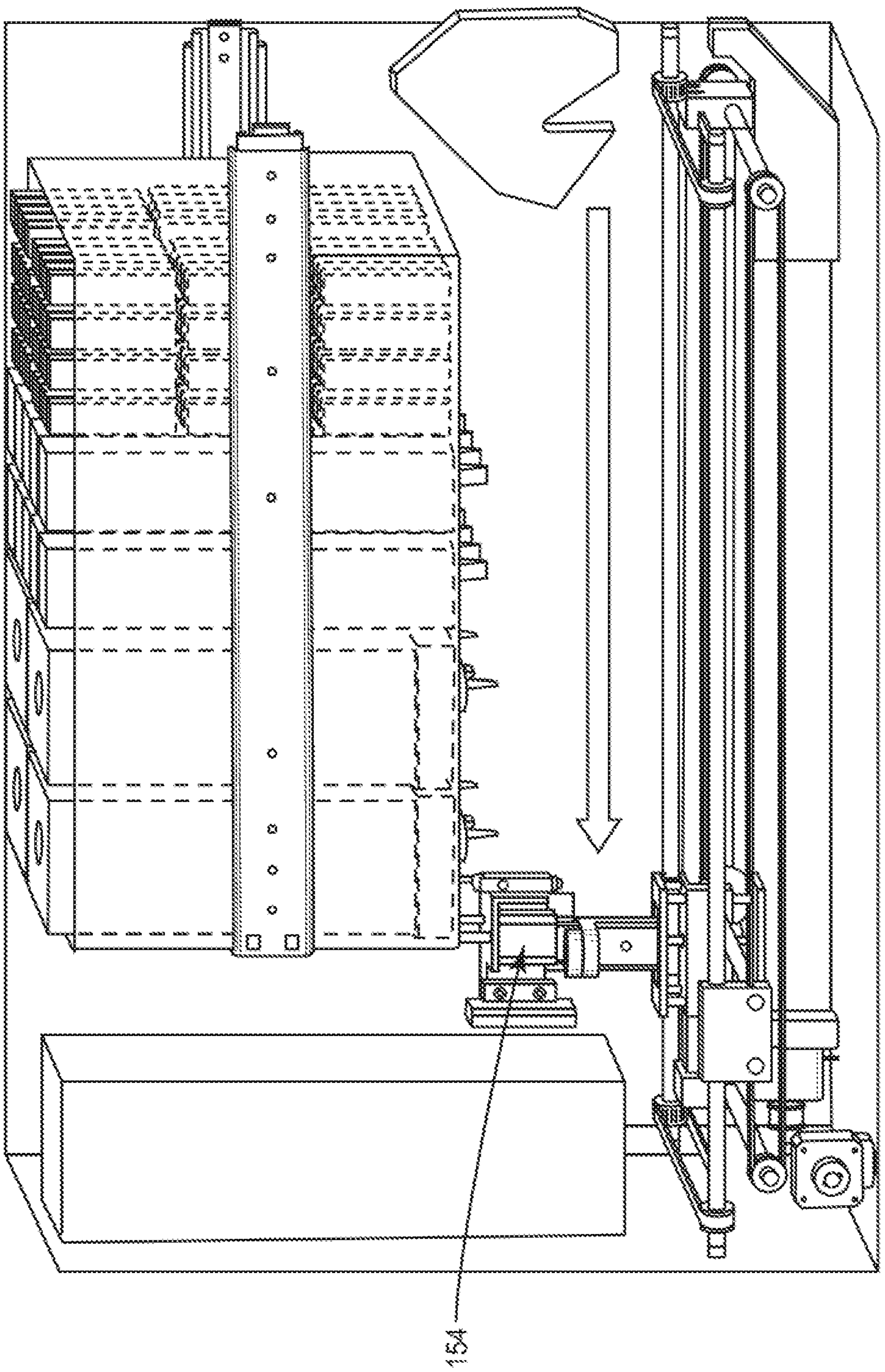

FIG. 6 shows the container at the capping station.

Figure 7:
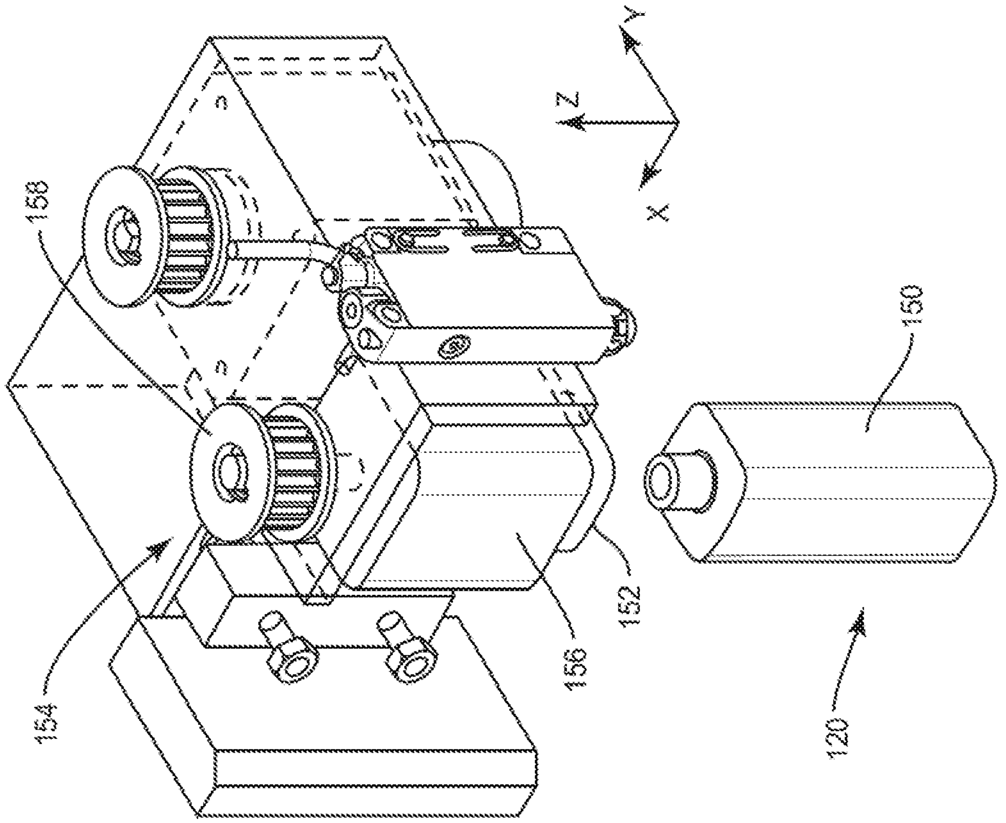

FIG. 7 is a detailed view of the capping station according to one embodiment.

Figure 8:
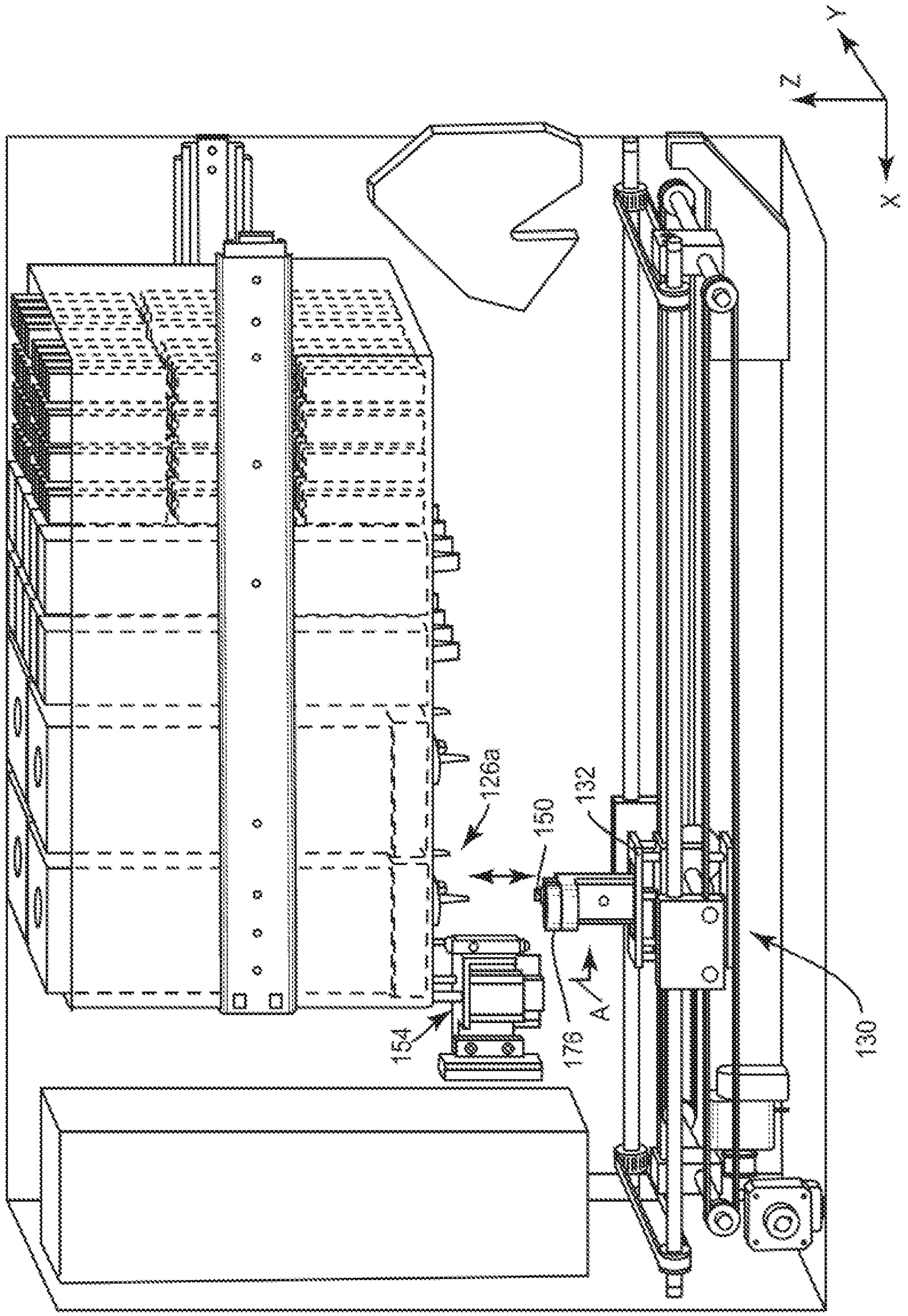

FIG. 8 shows the container at a first bulk material filling station.

Figure 9:
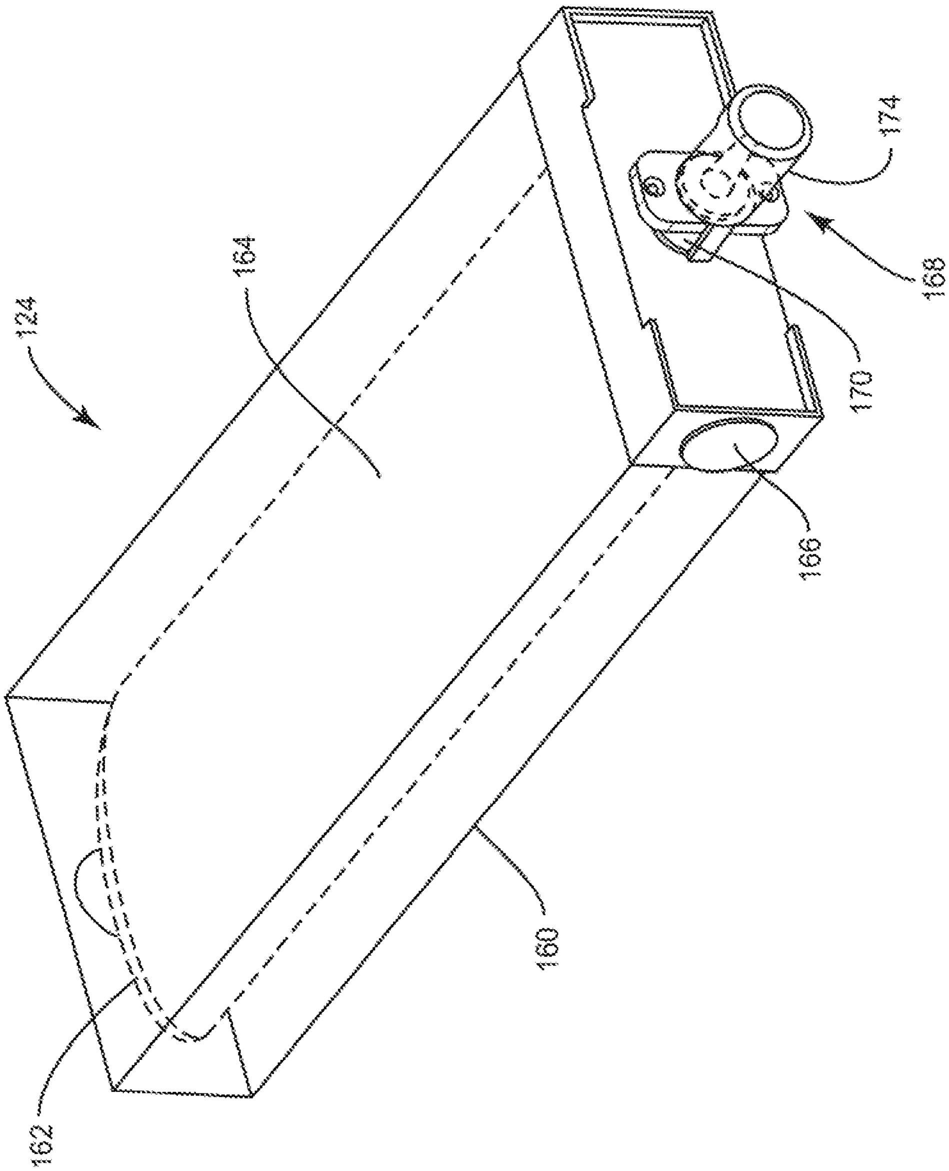

FIG. 9 shows a bulk material pack for use at the first bulk material filling station according to one embodiment.

FIGS. 10A-10D show steps of a filling process according to one embodiment.

Figure 11:
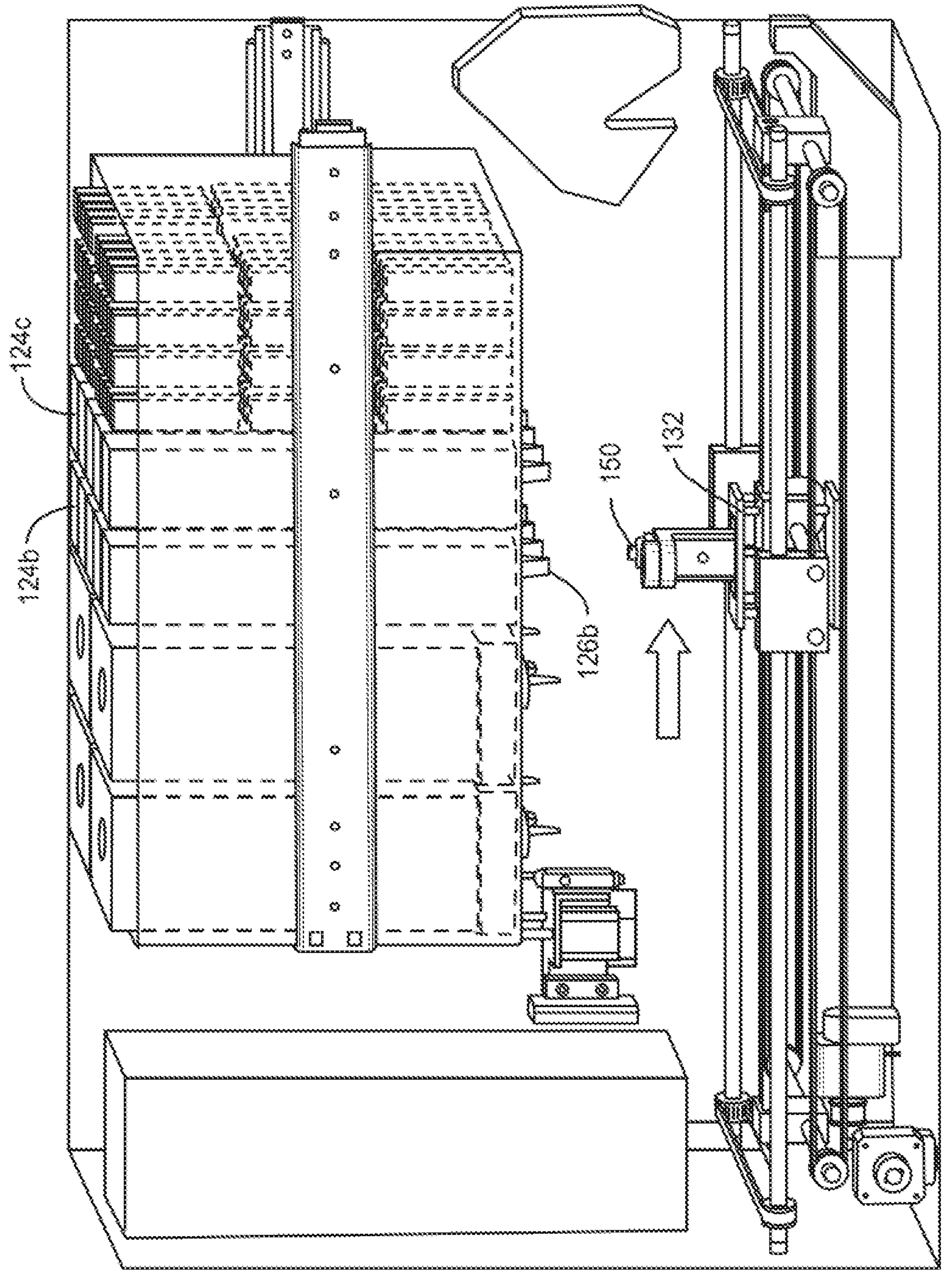

FIG. 11 shows the container at a second bulk material filling station.

Figure 12:
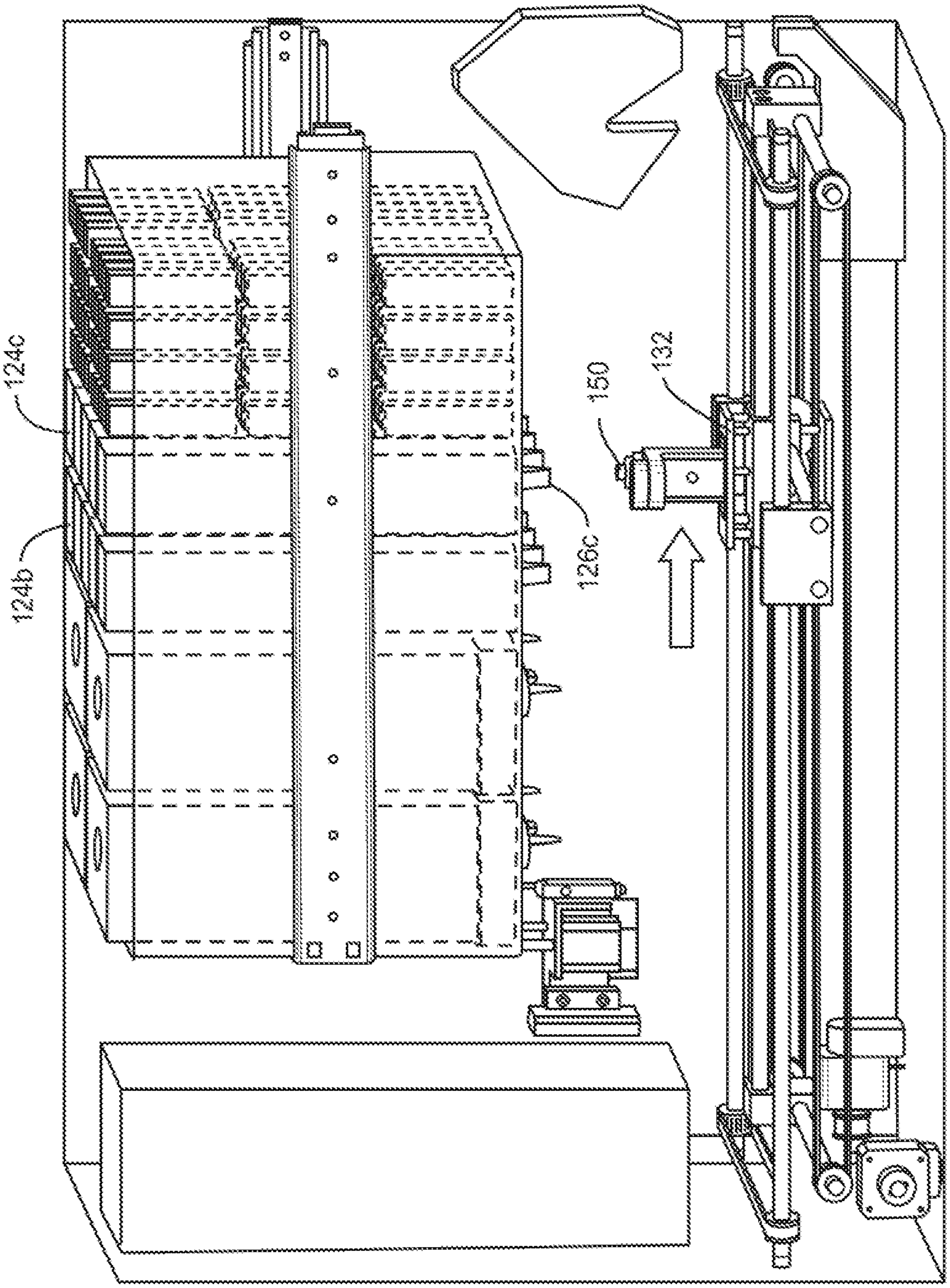

FIG. 12 shows the container at an optional third bulk material filling station.

Figure 13:
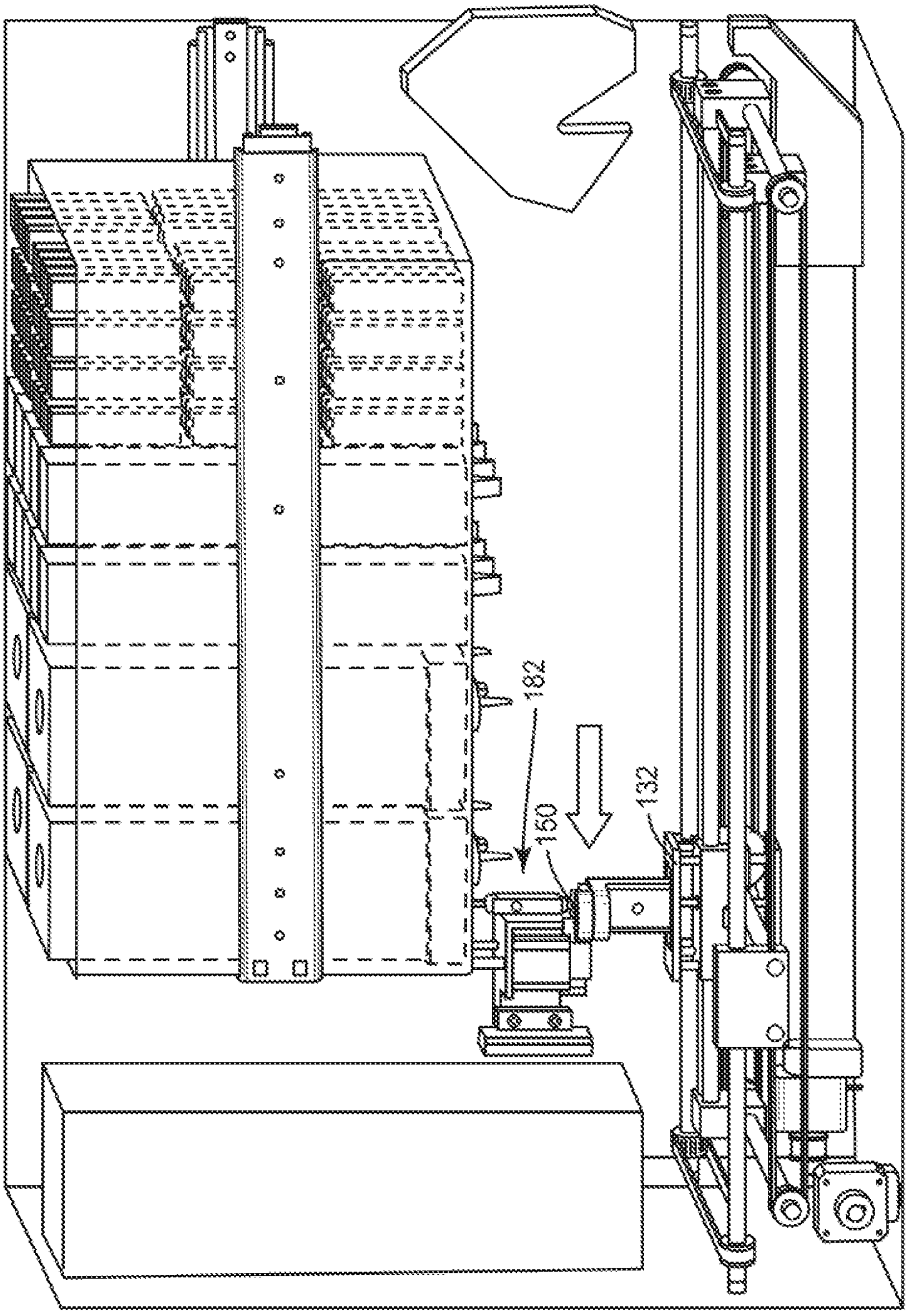

FIG. 13 shows the container at a testing station.

Figure 14B:
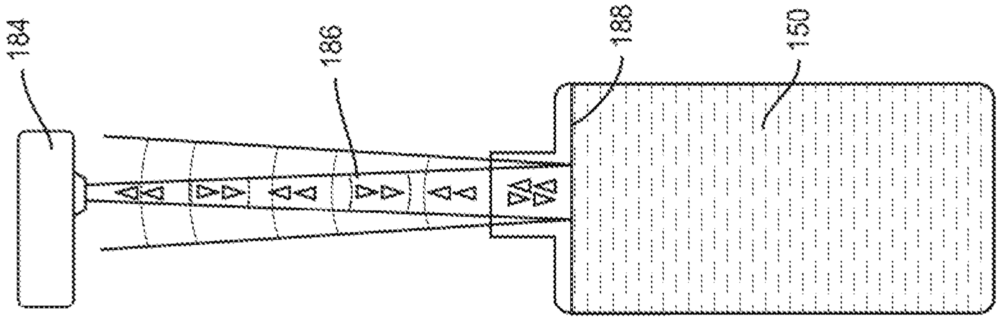
Figure 14A:
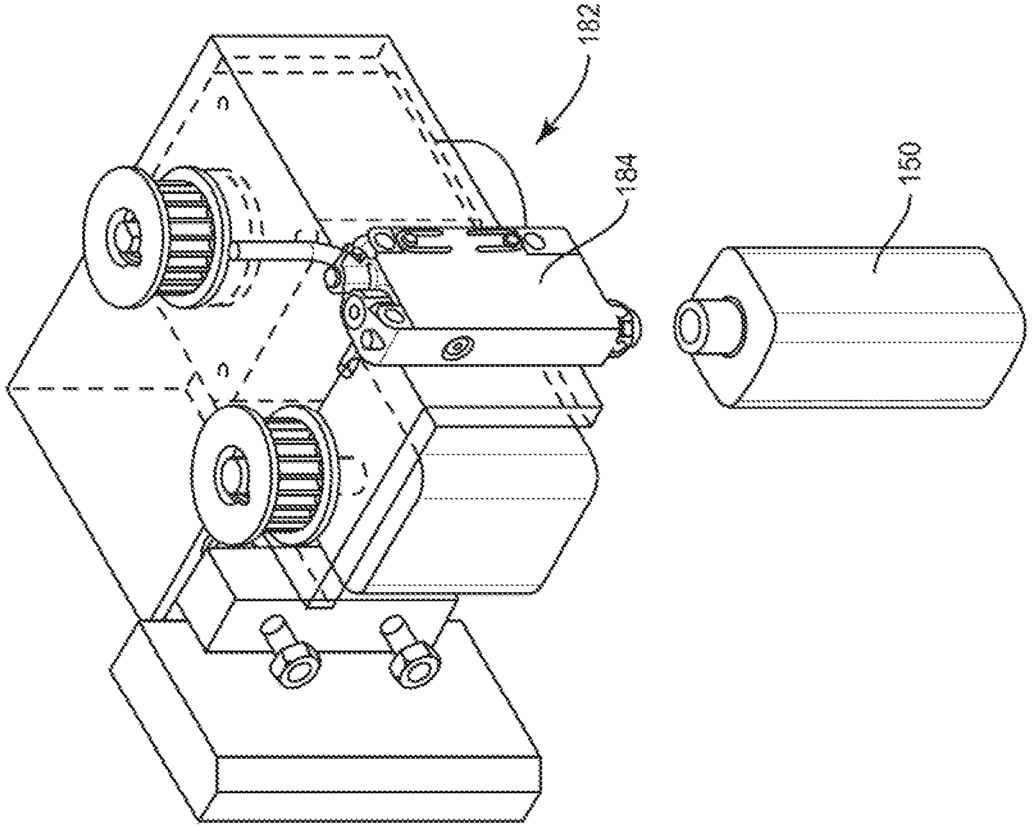

FIGS. 14A and 14B show details of the testing station according to one embodiment.

Figure 15:
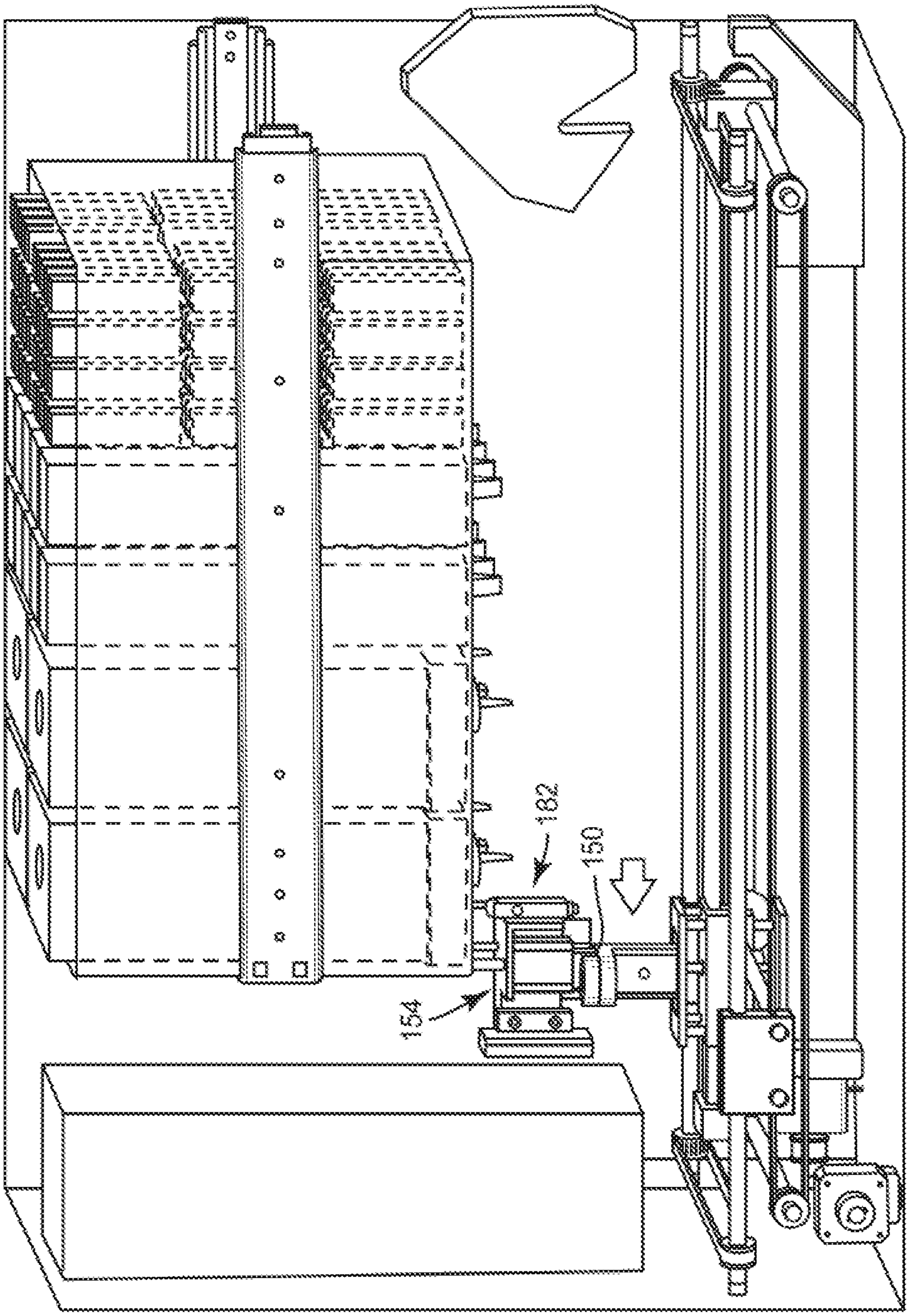

FIG. 15 shows the container returned to the capping station.

Figure 16:
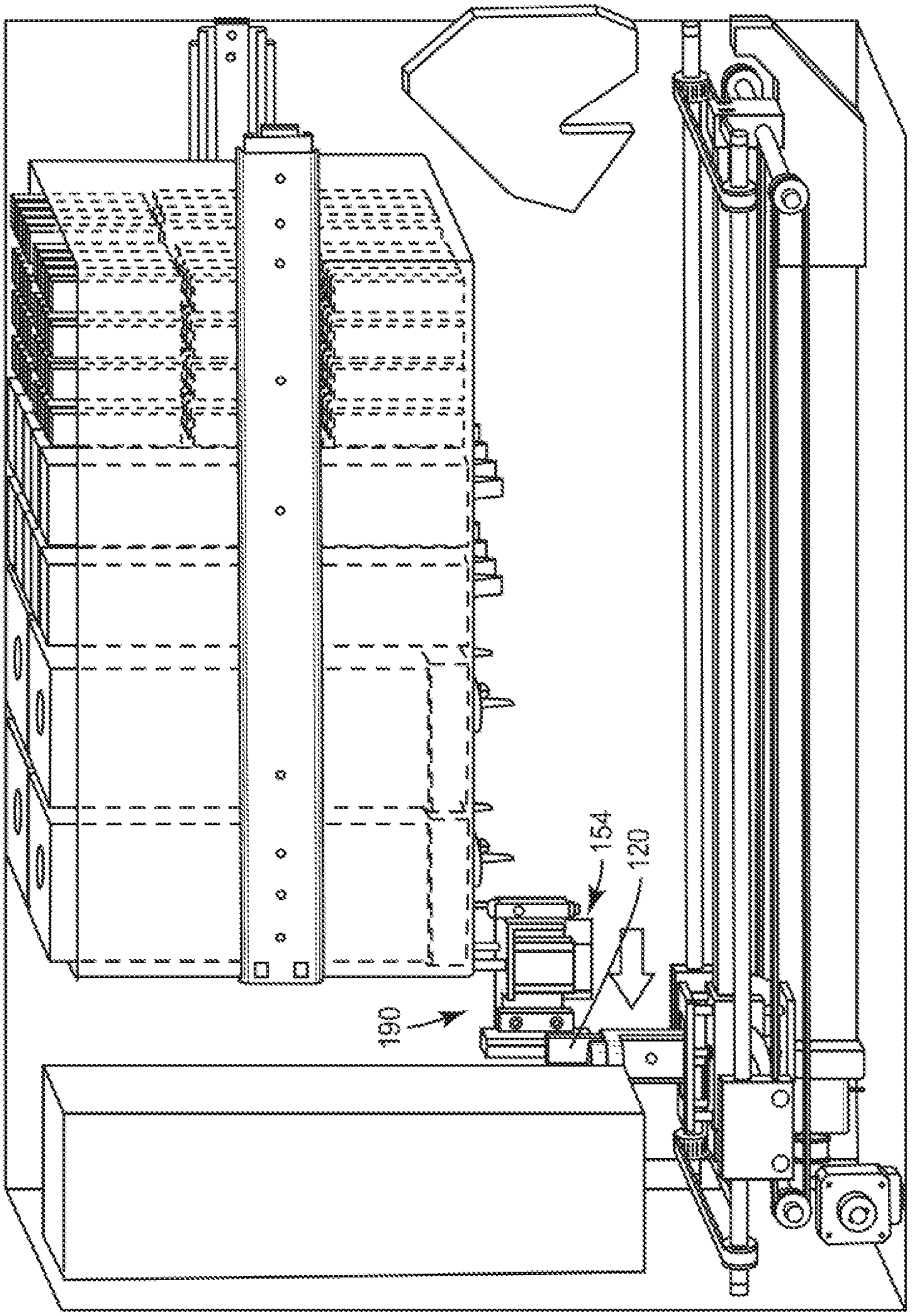

FIG. 16 shows the container at a labeling station.

Figure 17:
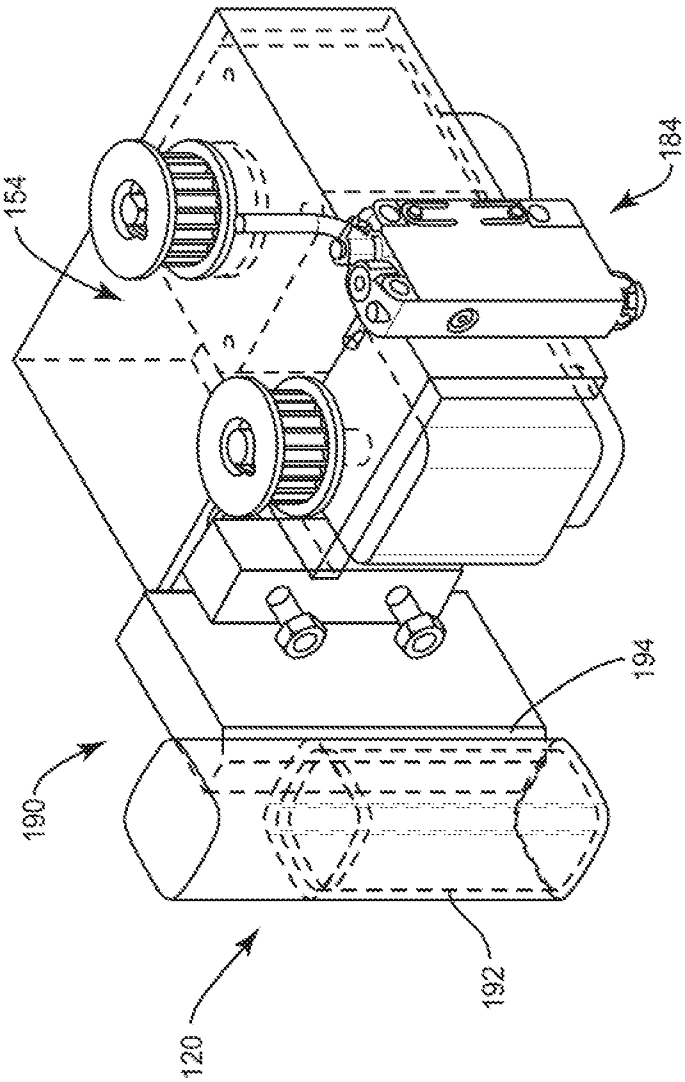

FIG. 17 shows details of the labeling station according to one embodiment.

Figure 18:
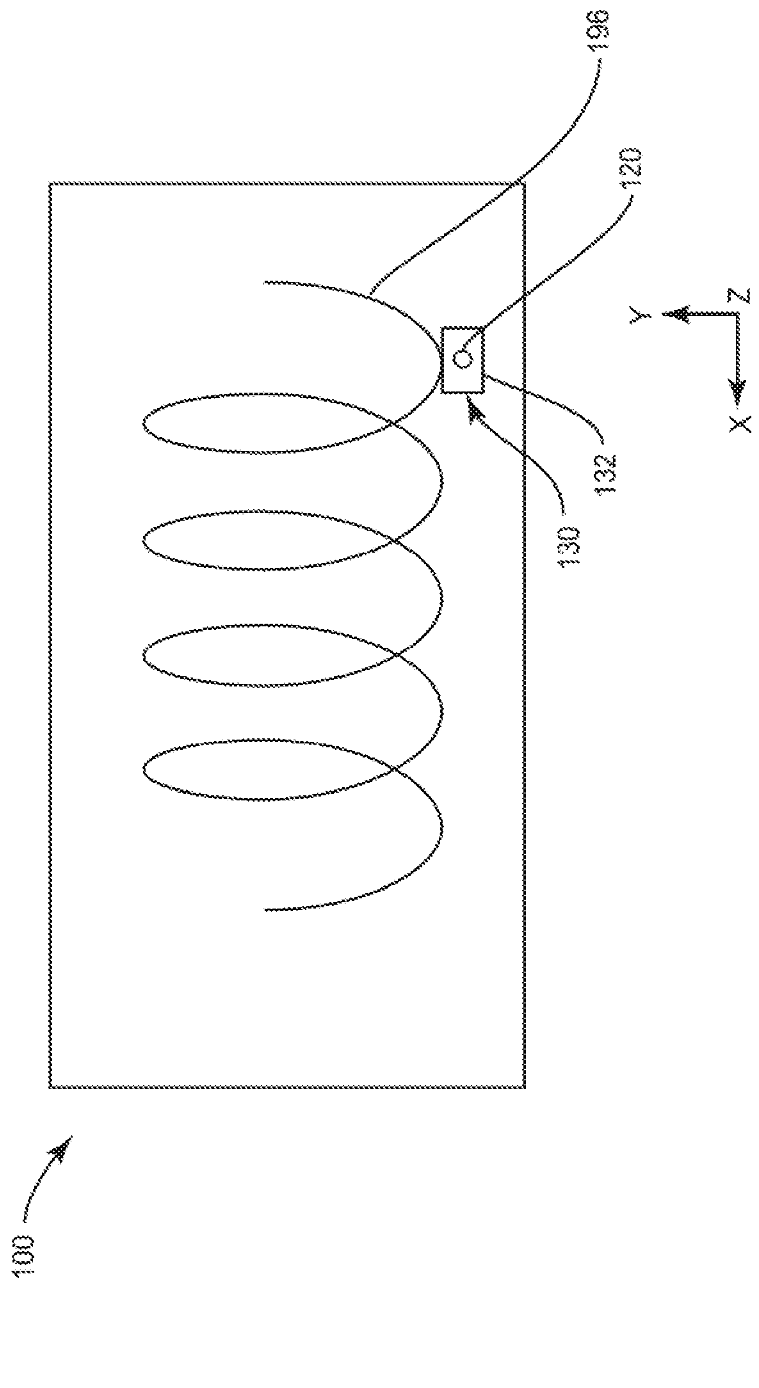

FIG. 18 is a top cut-away view of the dispenser unit schematically illustrating motion of the container provided by a robot to achieve mixing, according to one embodiment.

Figure 19:
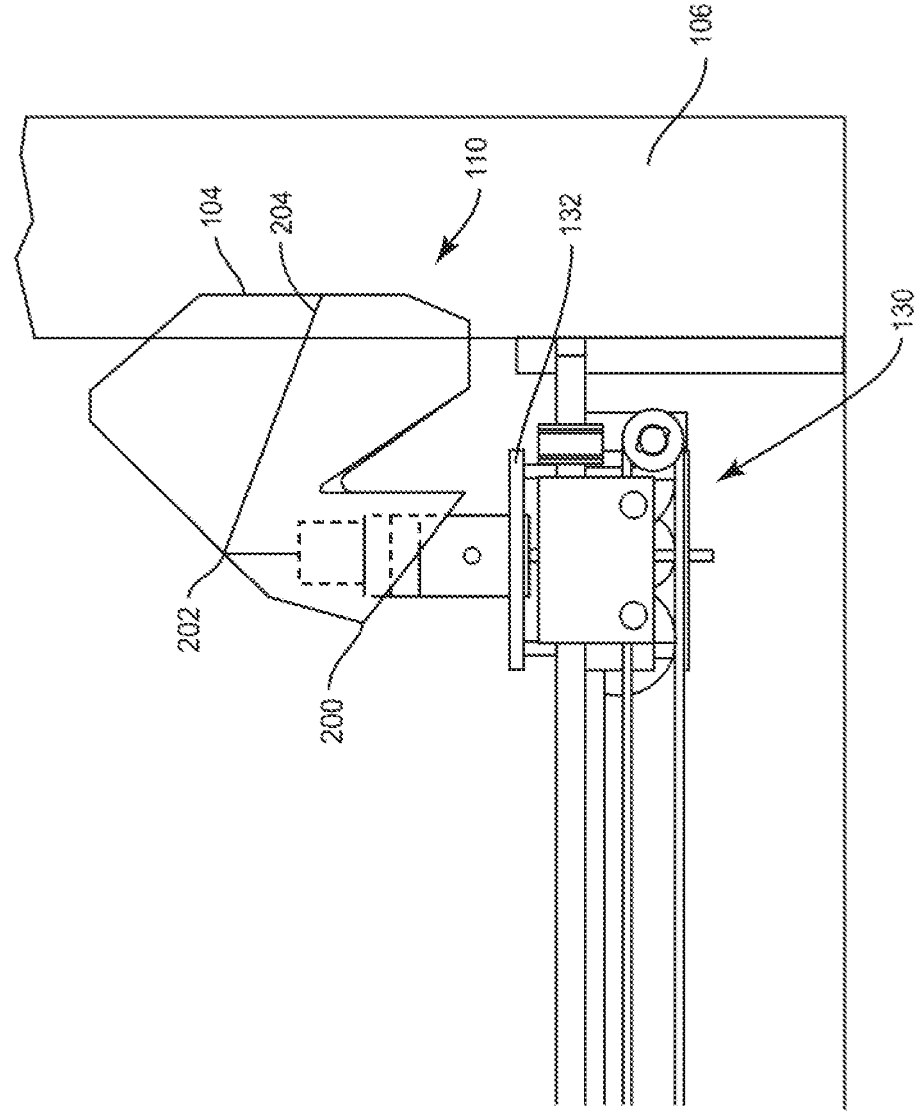

FIG. 19 is a detailed view of a discharge station according to one embodiment.

Figure 20:
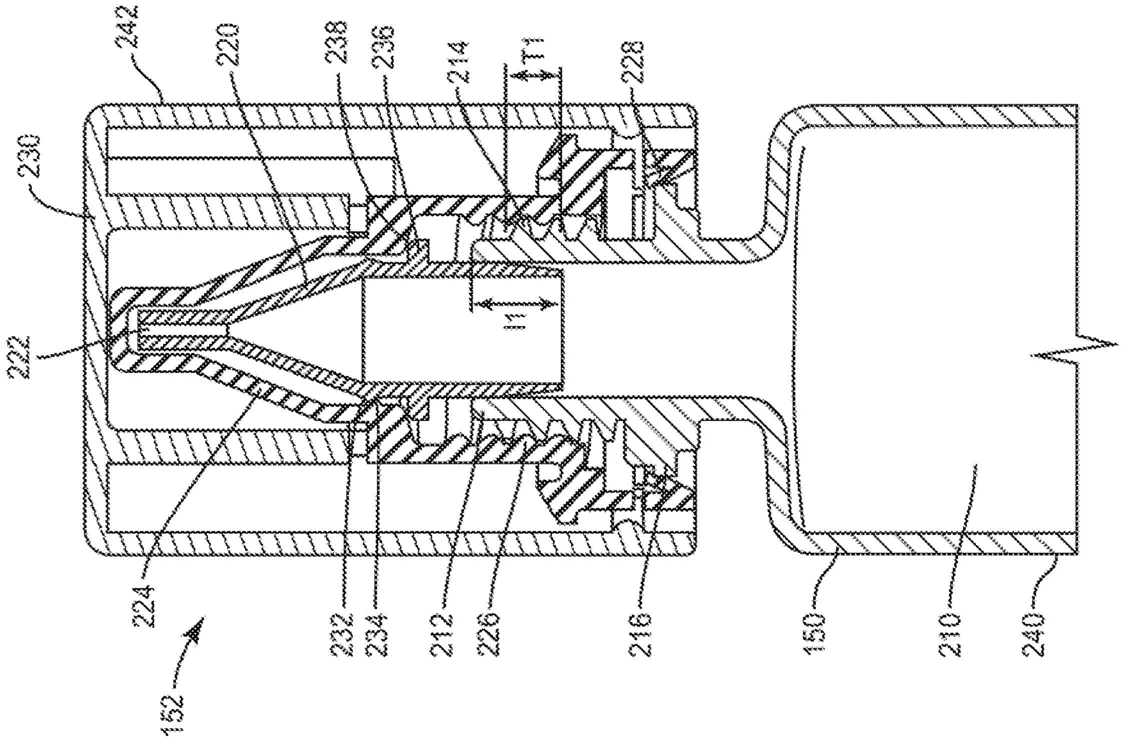

FIG. 20 shows a cross section of a container according to one embodiment in a pre-filled state.

Figure 21:
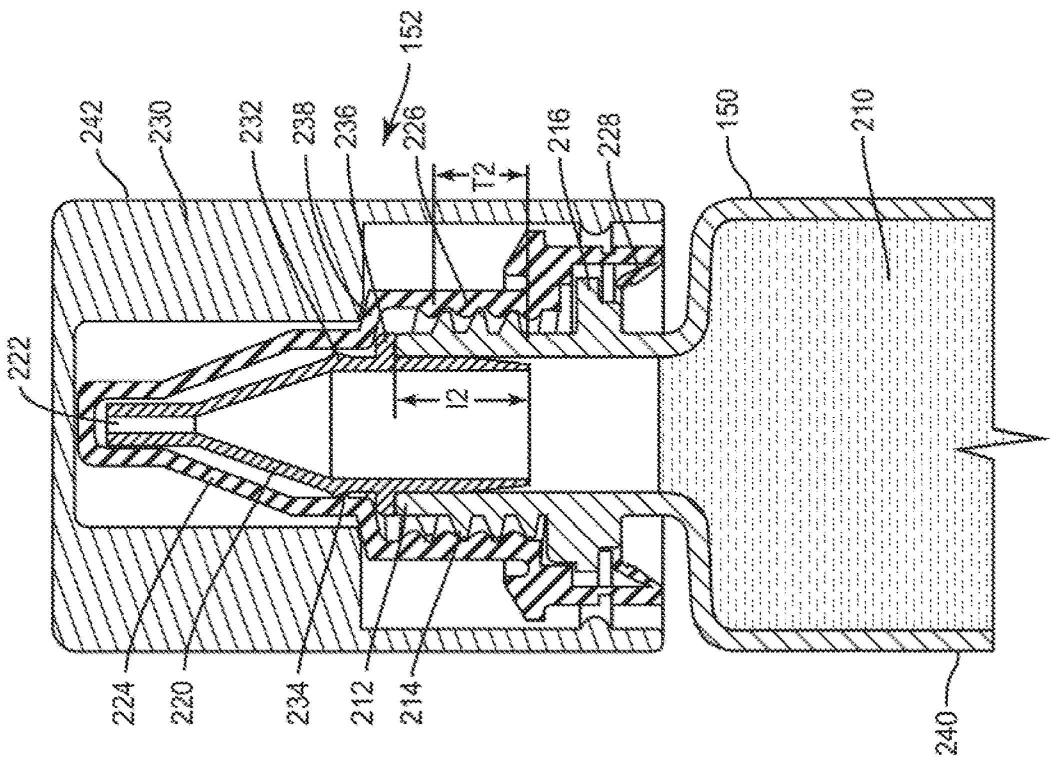

FIG. 21 shows a cross section of the container of FIG. 20 in a filled state.

Figure 22:
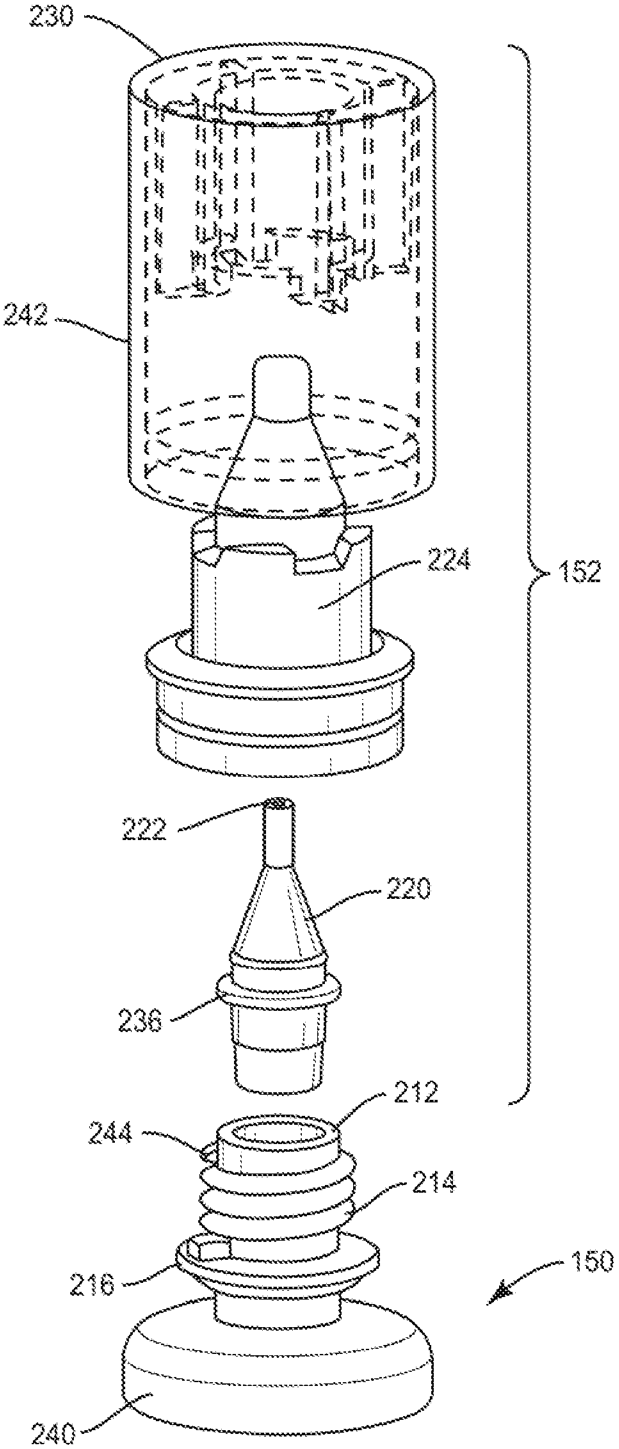

FIG. 22 is an exploded view of a portion of the container of FIG. 20.

Figure 23:
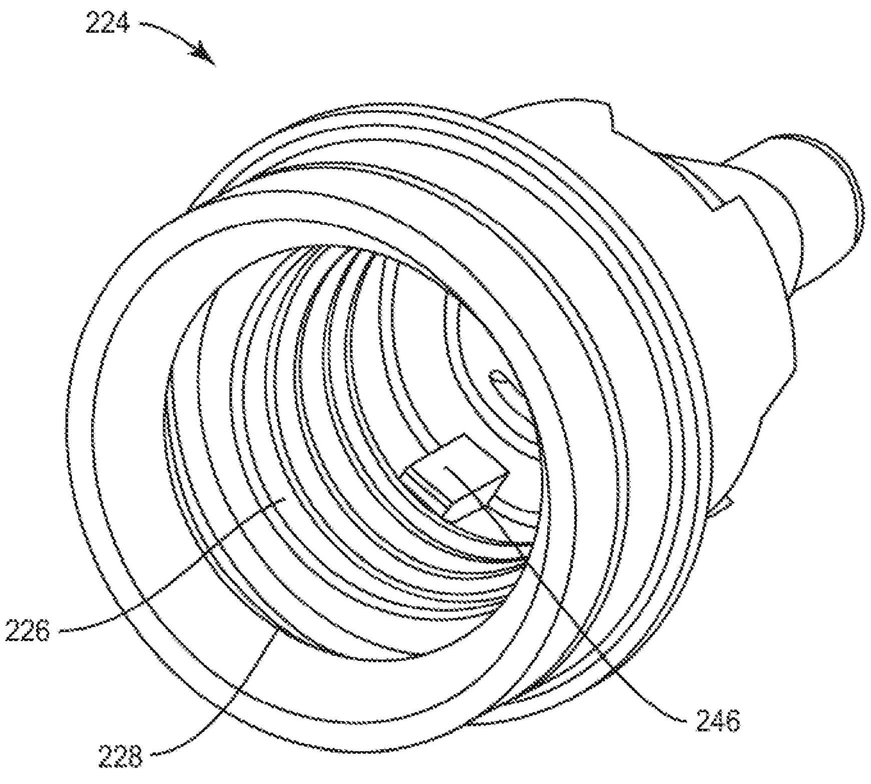

FIG. 23 is an interior detailed view of the nozzle of the container of FIG. 20.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

As described hereinafter, embodiments of the present disclosure relate to aerosol precursor compositions, containers for and containing the aerosol precursor compositions, devices for creating the compositions of aerosol precursor, and devices for dispensing one or more containers having the completed aerosol precursor composition therein. Related methods are also described and understood from the function of the articles and devices set forth below. Aerosol precursor (also referred to interchangeably as precursor, aerosol precursor composition, and aerosol precursor formulation) is a consumable liquid composition traditionally used in combination with an aerosol delivery device. Aerosol delivery devices generally use electrical energy to heat the aerosol precursor to form an inhalable substance. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device.

Aerosol delivery devices generally include a number of components. Aerosol delivery devices often include some combination of a power source (i.e., an electrical power source), at least one control component (e.g., means for actuating, controlling, regulating and ceasing power for heat generation, such as by controlling electrical current flow from the power source to other components of the article), a heater or heat generation component (e.g., an electrical resistance heating element or component commonly referred to as an "atomizer"), and an aerosol precursor composition (e.g., commonly a liquid capable of yielding an aerosol upon application of sufficient heat, commonly referred to as "smoke juice," "e-liquid" and "e-juice"), and a mouthed region or tip for allowing draw upon the aerosol delivery device for aerosol inhalation (e.g., a defined air flow path through the article such that aerosol generated can be withdrawn therefrom upon draw). Various aerosol delivery device designs and component arrangements can be appreciated upon consideration of the disclosed or commercially available electronic aerosol delivery devices, such as those representative products incorporated above in the present disclosure.

Turning to FIG. 1, embodiments of the present disclosure relate to a dispenser unit 100. In one embodiment, the dispenser unit 100 is customer or clerk operated to discharge a container having a custom blended aerosol precursor composition therein, the composition being available in a plurality of varieties. At a minimum, the custom blended aerosol precursor composition discharged from the dispenser unit 100 is available in at least two varieties, at least three varieties, at least five varieties, and preferably ten or more varieties. An upper limit on the number of varieties available may relate to the size of the dispenser unit 100 and any technical limitations on the equipment employed at the time of implementation of the presently disclosed dispenser unit. Aerosol precursor compositions are different varieties if they are distinct with respect to at least one of flavor and strength. Strength may refer to nicotine content or concentration. Strength may also refer to concentration of flavor materials within the aerosol precursor. Preferably, the custom blended aerosol precursor composition discharged from the dispenser unit 100 is created on-site, within the dispenser unit 100, by combining initially separate ingredients (e.g. aerosol precursor composition components, referred to herein as bulk materials). In one embodiment, the initially separate ingredients are first in contact within the container being discharged from the dispenser unit 100 to the user (e.g. the customer or the clerk).

The dispenser unit 100 according to embodiments of this disclosure is intended to be relatively small in size, potentially capable of placement on a desk or counter, for operation by a retail clerk, or properly screened customer. The scale of the dispenser unit 100, however, may be increased as desired in light of the present disclosure. The dispenser unit 100 may include a user interface 102 provided in any easy to locate and easy to operate position on or adjacent to the exterior of the dispenser unit. The user interface 102 may be configured to allow the user to make selections (e.g. provide selection information) that result in a preferred aerosol precursor being dispensed to the user. For example, the user may personalize the flavor and/or strength (e.g. nicotine content) of their aerosol precursor though the use of a plurality of options and menus displayed on the user interface 102. The user interface 102 may be a touchscreen. Alternatively, the user interface 102 may include a display separate from an input device, such as a keypad.

The dispenser unit 100 may also include an opening 104 connected to a chute for discharging filled containers to the user. The opening 104 may include a door, flap, valve, drawer, or other structure that selectively opens when the filled container is ready to be retrieved or received by the user. The door may be manually opened by a user or automatically opened via control by the dispenser unit 100.

As shown in FIG. 2, the dispenser unit 100 may have an access door 106 to allow maintenance personnel or retailers to access the interior of the dispenser unit 100 to perform maintenance, updates, or to restock the dispenser unit 100 with at least the bulk materials and empty containers necessary to perform the unit's operations. The access door 106 is not limited to hinged doors, but may include any other suitable closure. The access door 106 is shown on the front of the dispenser unit 100, but the access door 106 may be placed in any other suitable location based upon the desire to provide access to the internal mechanisms of the dispenser unit 100. Therefore, the configuration of the access door 106 may be influenced by the arrangement and packaging of the internal components and stations within the dispenser unit 100. While a single access door 106 is shown in FIG. 2, it should be well understood that the dispenser unit 100 may include a plurality of separate access doors 106 to provide for the necessary internal access.

As seen in FIG. 1, the exterior of the dispenser unit 100 may include a variety of other ports, plugs, scanners, readers and other devices operably accessible to the user. For example, the dispenser unit 100 may include a reader 108, such as a scanner, sensor, camera, etc. for bar codes, QR codes, magnetic strips, Radio-Frequency Identification (RFID), Near Field Communication (NFC) and other optical and electromagnetic identification, which may be used to provide information to the dispenser unit 100 in addition to, or instead of, the user interface 102. In one embodiment, the dispenser unit 100 may be configured to determine the identity of the user through identification cards, such as a driver's license or an employee badge. The dispenser unit 100 may include cameras recording the user to help avoid theft or apprehend vandals. The dispenser unit 100 may have a reader for codes on coupons or other brochures. For example, the store may wish to advertise the favorite aerosol precursor recipes of their employees. These recipes may be indicated by bar codes that can be scanned by the user to have the dispenser unit 100 create the pre-determined recipe. Users may have their own preferences stored on key tags or other internal or external storage medium, such as memory, that can be read by the dispenser unit 100 to expedite the vending of the customer's preferred aerosol precursor. In one example the customer's recipe may be created using a website or mobile application. The customer's smart phone may then be programmed to display a corresponding bar code that can be read by a bar code reader in operable communication with the dispenser unit 100. The customer's recipe may be incorporated within a mobile application such that the application is able to transmit the recipe information to the dispenser unit 100 through near field wireless technology such as Bluetooth®. The mobile application may facilitate other functions in combination with a user profile, such as storing a history of purchases, facilitating a rewards program, for wirelessly facilitating payment for the aerosol precursor. Other readers may facilitate the direct purchase of the desired product directly from the dispenser unit 100 with credit card readers, cash acceptance means, or other devices for accepting payment known in the art.

In one embodiment, the dispenser unit 100 may include ports or plugs that allow the user to recharge a power unit of their aerosol delivery device while the dispenser unit is preparing their personalized precursor.

The dispenser unit 100 may also have one or more ports, plugs, or devices to facilitate operation of the dispenser unit that are not intended to be user accessible or user-facing. These may include items like power cords for providing the dispenser unit 100 with power, or Ethernet ports to allow the unit to network with remote databases on the world wide web or as part of the retail location's operations. For example, the dispenser unit 100 may be linked to a store's register so that the unit will only dispense the desired product after the customer has paid for the product, or after the sales clerk has verified the age or other identifying characteristics of the user.

The dispenser unit 100 itself may be able to store a consumer's preferences to streamline the dispensing process. The dispenser unit 100 may be networked to other similar units, networked to the internet, or provided with reader technology so that a customer may receive their preferred precursor without returning to the same unit each time or making a full set of selections on the user interface 102.

FIG. 2 shows the dispenser unit 100 with the access door 106 open. A discharge chute 110 may be attached to swing with the access door 106. A removable waste bin 112 may also ride along with the access door 106. The waste bin 112 is configured to receive products produced by the dispenser unit 100 that do not conform to a preferred standard. Also shown are an inner door 114 optionally provided to hide and protect the moving parts within the dispenser unit 100. A raw material drawer 116 may be configured to slide out to facilitate restocking the drawer with empty containers or bulk material components of the aerosol precursor.

FIG. 3 is a cut-away of the dispenser unit 100 to reveal an internal arrangement of stations, features and elements according to an embodiment of the present disclosure. The raw material drawer 116 may comprise a bulk consumable pack 118 staging a plurality of containers 120 configured to be filled with a custom blended aerosol precursor composition. The containers 120 within the bulk consumable pack 118 may be empty or may be partially filled with an ingredient of the custom blended aerosol precursor composition. The bulk consumable pack 118 may take a number of forms, including a tray with cells for receiving containers 120, a hopper, or other configuration facilitating the retrieval of one container 120 from a group. The raw material drawer 116 may have a plurality of additional compartments 122 configured to receive ingredients for use in making the precursor. Each compartment 122 is configured to receive a bulk material pack 124 to create a bulk material filling station 126 for a container 120.

The aerosol precursor resulting from the container 120 visiting two or more of the bulk material filling stations 126 is not particularly limited. Several optional characteristics of representative precursor are discussed below. The aerosol precursor is composed of a combination or mixture of various ingredients (i.e. components). The selection of the particular aerosol precursor components, and the relative amounts of those components used, may be altered based on user input at the user interface 102 in order to control the overall chemical composition of the mainstream aerosol produced by an atomizer of an aerosol delivery device. Of particular interest are aerosol precursors that can be characterized as being generally liquid in nature. For example, representative generally liquid aerosol precursors may have the form of liquid solutions, mixtures of miscible components, or liquids incorporating suspended or dispersed components. Typical aerosol precursors are capable of being vaporized upon exposure to heat under those conditions that are experienced during use of the aerosol delivery devices that are characteristic of the current disclosure; and hence are capable of yielding vapors and aerosols that are capable of being inhaled.

The aerosol precursor may incorporate a so-called "aerosol former" component that may be provided within one or more first filling stations 126*a*. Such materials have the ability to yield visible aerosols when vaporized upon exposure to heat under those conditions experienced during normal use of atomizers that are characteristic of the current disclosure. Such aerosol forming materials include various polyols or polyhydric alcohols (e.g., glycerin, propylene glycol, and mixtures thereof). Many embodiments of the present disclosure incorporate aerosol precursor components that can be characterized as water, moisture or aqueous liquid. During conditions of normal use of certain aerosol delivery devices, the water incorporated within those devices can vaporize to yield a component of the generated aerosol. As such, for purposes of the current disclosure, water that is present within the aerosol precursor may be considered to be an aerosol forming material.

A variety of flavoring agents or flavor materials that alter the sensory character or nature of the drawn mainstream aerosol comprise the second major component of the aerosol precursor, and may be provided within second filling stations 126*b*. Each of the second filling stations 126*b* may provide a unique flavor material. Additionally, the most popular flavors may be provided at more than one second filling station 126*b*. Flavoring agents may be selectively added within the aerosol precursor to alter the flavor, aroma and organoleptic properties of the aerosol. Certain flavoring agents may be provided from sources other than tobacco. Exemplary flavoring agents may be natural or artificial in nature, and may be employed as concentrates or flavor packages.

Exemplary flavoring agents include vanillin, ethyl vanillin, cream, tea, coffee, fruit (e.g., apple, cherry, strawberry, peach and citrus flavors, including lime and lemon), floral flavors, savory flavors, maple, menthol, mint, peppermint, spearmint, wintergreen, nutmeg, clove, lavender, cardamom, ginger, honey, anise, sage, cinnamon, sandalwood, jasmine, cascarilla, cocoa, licorice, and flavorings and flavor packages of the type and character traditionally used for the flavoring of cigarette, cigar and pipe tobaccos. Syrups, such as high fructose corn syrup, also can be employed. Certain flavoring agents may be incorporated within aerosol forming materials prior to formulation of a final aerosol precursor mixture (e.g., certain water soluble flavoring agents can be incorporated within water, menthol can be incorporated within propylene glycol, and certain complex flavor packages can be incorporated within propylene glycol).

For aerosol delivery devices that are characterized as electronic cigarettes, the aerosol precursor most preferably incorporates tobacco or components derived from tobacco (referred to herein as "nicotine sources"). These nicotine sources may be present within one or more third filling stations 126*c*. The third filling stations 126*c* may be referred to as nicotine stations. In one regard, the tobacco may be provided as parts or pieces of tobacco, such as finely ground, milled or powdered tobacco lamina. In another regard, the tobacco may be provided in the form of an extract, such as a spray dried extract that incorporates many of the water soluble components of tobacco. Alternatively, tobacco extracts may have the form of relatively high nicotine content extracts, which extracts also incorporate minor amounts of other extracted components derived from tobacco. In another regard, components derived from tobacco may be provided in a relatively pure form, such as certain flavoring agents that are derived from tobacco. In one regard, a component that is derived from tobacco, and that may be employed in a highly purified or essentially pure form, is nicotine (e.g., pharmaceutical grade nicotine).

Aerosol precursors also may include ingredients that exhibit acidic or basic characteristics (e.g., organic acids, ammonium salts or organic amines). These ingredients may be included in the general description of the flavor materials for the purpose of this disclosure. For example, certain organic acids (e.g., levulinic acid, succinic acid, lactic acid, and pyruvic acid) may be included in an aerosol precursor formulation incorporating nicotine, preferably in amounts up to being equimolar (based on total organic acid content) with the nicotine. For example, the aerosol precursor may include about 0.1 to about 0.5 moles of levulinic acid per one mole of nicotine, about 0.1 to about 0.5 moles of succinic acid per one mole of nicotine, about 0.1 to about 0.5 moles of lactic acid per one mole of nicotine, about 0.1 to about 0.5 moles of pyruvic acid per one mole of nicotine, or various permutations and combinations thereof, up to a concentration wherein the total amount of organic acid present is equimolar to the total amount of nicotine present in the aerosol precursor.

As one non-limiting example, a representative aerosol precursor created by the dispenser unit 100 at the request of the user can have the form of a mixture of about 70% to about 90% glycerin, often about 75% to about 85% glycerin; about 5% to about 20% water, often about 10% to about 15% water; about 1% to about 10% propylene glycol, often about 4% to about 8% propylene glycol; about 0.1% to about 6% nicotine, often about 1.5% to about 5% nicotine; and optional flavoring agent in an amount of up to about 6%, often about 0.1% to about 5% flavoring agent; on a weight basis. For example, a representative aerosol precursor may have the form of a formulation incorporating greater than about 76% glycerin, about 14% water, about 7% propylene glycol, about 1% to about 2% nicotine, and less than about 1% flavor material, on a weight basis. For example, a representative aerosol precursor may have the form of a formulation incorporating greater than about 75% glycerin, about 14% water, about 7% propylene glycol, about 2.5% nicotine, and less than about 1% flavor material. For example, a representative aerosol precursor may have the form of a formulation incorporating greater than about 75% glycerin, about 5% water, about 8% propylene glycol, about 6% nicotine, and less than about 6% flavor material, on a weight basis.

Representative types of aerosol precursor components and formulations are also set forth and characterized in U.S. Pat. No. 7,726,320 to Robinson et al. and U.S. Pat. Pub. Nos. 2013/0008457 to Zheng et al.; 2013/0213417 to Chong et al. and 2014/0060554 to Collett et al., 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU™ product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC. Embodiments of effervescent materials can be used with the aerosol precursor, and are described, by way of example, in U.S. Pat. App. Pub. No. 2012/0055494 to Hunt et al., which is incorporated herein by reference. Further, the use of effervescent materials is described, for example, in U.S. Pat. No. 4,639,368 to Niazi et al.; U.S. Pat. No. 5,178,878 to Wehling et al.; U.S. Pat. No. 5,223,264 to Wehling et al.; U.S. Pat. No. 6,974,590 to Pather et al.; and U.S. Pat. No. 7,381,667 to Bergquist et al., as well as US Pat. Pub. Nos. 2006/0191548 to Strickland et al.; 2009/0025741 to Crawford et al; 2010/0018539 to Brinkley et al.; and 2010/0170522 to Sun et al.; and PCT WO 97/06786 to Johnson et al., all of which are incorporated by reference herein.

In addition to the bulk material filling stations, the dispenser unit 100 also includes a robot 130. As best seen in FIG. 4, the robot 130 may include a stage 132 (as referred to as a container holder) for holding a container 120 and translating the container through at least two dimensions. For example, the stage 132 may be driven by a first actuator 134 to travel along an X axis as guided on rails 136. A second actuator 138 may drive the stage 132 to travel along a Y axis as guided on supports 140. The actuators 134, 138 may be directed by a controller 142 with a processor in operative communication with the actuators 134, 138 and the user interface 102. Based on the preferred precursor composition, and the inventory levels of each bulk material filling station 126, the controller 142 is configured to stop the stage 132 at each of the appropriate bulk material filling stations and withdraw an appropriate amount of each bulk material into a container 120.

FIG. 3 shows the stage 132 of the robot 130 positioned below the bulk consumable pack 118 as a container receiving station 144. Upon activation of the dispenser unit 100, such as by the completion of a precursor selection and purchasing transaction, the stage 132 may be signaled by the controller to report to the container receiving station 144 and retrieve an empty container 120.

Figure 5A:
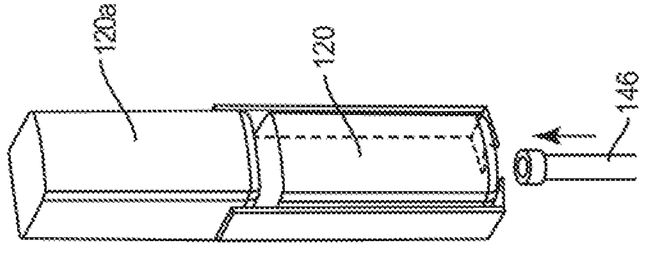
Figure 5B:
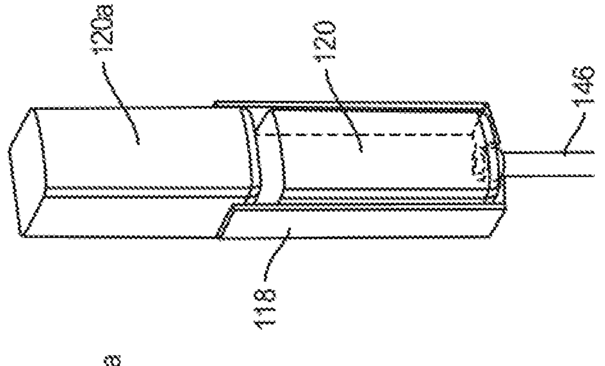
Figure 5C:
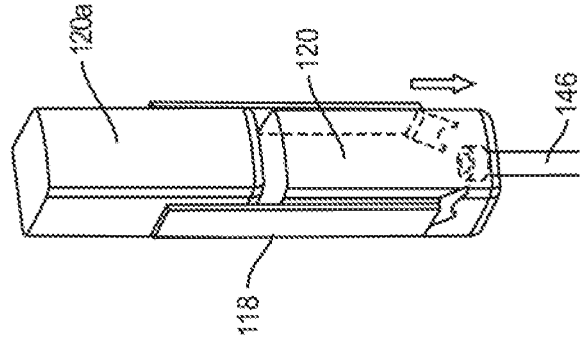
Figure 5D:
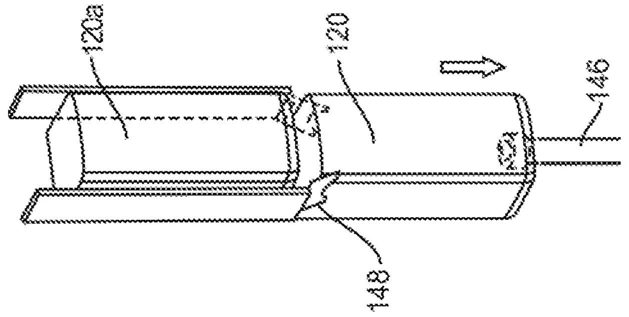
Figure 5E:
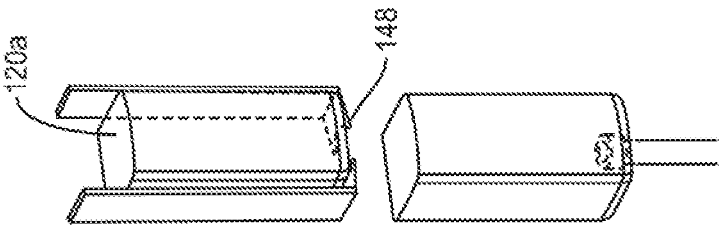

One example process for retrieving an empty container 120 from the bulk consumable pack 118 is shown in FIGS. 5A-5E, wherein only a partial view of the bulk consumable pack 118 is shown for ease of illustration. The robot 130 may have an extendable suction cup 146 that can be raised into contact with the bottom of an empty container 120. Suction may be applied to grip the bottom of the container 120 as shown in FIG. 5B. With suction applied, the suction cup 146 may be lowered, pulling the container 120 from the bulk consumable pack 118, as shown in progression in FIG. 5C and FIG. 5D. The bulk consumable pack 118 may be gravity fed so that as the empty container 120 is removed the next container 120*a* above falls down to a ready position. The bottom of the bulk consumable pack 118 may include friction tabs 148 to prevent removal of additional containers when the pulling force of a suction cup 146 is not applied. As seen in FIG. 5E after one container 120 has been retrieved, the next container 120*a* is correctly positioned for the next run of the dispenser unit 100.

The gravity fed bulk consumable pack 118 with suction activated pull down retrieval is only one possible configuration for selecting an empty container 120 and engaging it with a stage 132 of a robot 130. For example, instead of the bulk consumable pack 118 being part of the raw material drawer 116, the bulk consumable pack 118 may be formed as an independent tray within the dispenser unit 100. The bulk consumable pack 118 may alternatively be provided below the robot 130. The container receiving station 144 may not be a single location or a plurality of closely adjacent locations. Instead, for example, if the empty containers 120 are arranged one-deep across a tray placed below the robot 130, the container receiving station 144 may be any location within the dispenser unit 100 corresponding with an available empty container.

As discussed further below, the bulk consumable pack 118 may be configured to receive empty containers 120 that include both a bottle 150 and a cap 152 (see FIG. 7) pre-attached to one another. In other embodiments, separate bulk consumable pack s may be provided with bottles 150 and caps 152, in which case the dispenser unit 100 would be configured to combine a bottle 150 with a respective cap 152 only after filling the bottle with the aerosol precursor composition.

Where the container 120 initially includes a cap 152, the robot 130 may be activated to move the container from the container receiving station 144 to a capping station 154, said movement being illustrated by the horizontal, bold arrow in FIG. 6. An example of a capping station 154 is shown in FIG. 7. The capping station 154 may include a cap retainer 156. At the capping station 154, the robot 130 aligns the container 120 with the cap retainer 156. In the illustrated example, at least one of the container 120 and the cap retainer 156 are moved vertically along the Z axis to engage the cap retainer with the cap 152 of the container. In one embodiment, the robot 130 and/or the stage 132 is configured to lift the container 120 into engagement with the cap retainer 156. Engagement may be facilitated by vacuum pressure, friction, a detent mechanism, or other known means that allow the cap retainer 156 to grip the cap 152 and temporarily retain the cap while the remainder of the container 120 (e.g. the bottle 150) is moved away. In the illustrated embodiment, the cap 152 is removed from the bottle 150 by rotation. Therefore the capping station 154 may further comprise a rotational actuator 158 in connection with the cap retainer 156 to rotate the cap 152 relative to the bottle 150. The cap retainer 156 may be driven to rotate by a motor either directly or indirectly by using a belt system or a gear system. In other embodiments, one of ordinary skill in the art will appreciate that the stage 132 may have a mechanism to rotate the bottle 150 while the cap 152 and the cap retainer 156 remain substantially stationary relative to the dispenser unit 100.

Turning to FIG. 8, the stage 132 has been moved away from the capping station 154 to a first bulk material filling station 126*a* as shown by the bold arrow A. The bottle 150 is ready to receive the precursor ingredients. Again, the cap 152 may have been initially separate from the bottle 150 or may have been separated from the bottle by the capping station 154. As discussed above, the first filling station 126*a* may provide aerosol former. Aerosol former will be included in substantially all aerosol precursor compositions. Aerosol former, however, is not necessarily the first ingredient dispensed into the bottle 150.

As mentioned above, the first fillings station 126*a* may include a first bulk material pack 124*a*. An exemplary bulk material pack 124 is shown in FIG. 9 removed from the compartment 122. The bulk material pack 124 is shown with a bag-in-a-box configuration having a shell 160 with a bladder bag 162 positioned inside. The shell 160 may include cardboard portions and plastic portions. Rigid plastic portions of the shell 160 may be used to engage a respective compartment 122 within the raw material drawer 116. The bladder bag 162 provides a reservoir 164 for a bulk material component of an aerosol precursor composition. The reservoir 164 may have a volume of at least about 500 ml for some bulk materials. The reservoir 164 for other bulk material packs 124 may have a volume of at least about 2000 ml. An RFID tag 166 may be applied to the shell 160 for use as discussed below.

The bulk material pack 124 may further include a pump 168 that is integrated with the reservoir 164. The pump 168 may include a staging chamber 170 between the reservoir 164 and an outlet 172 (see FIG. 10A). The staging chamber 170 may be configured to hold a measured dose of the respective bulk material such that each activation of the pump 168 emits a measured dose of bulk material from the outlet 172. In some embodiments, a drip guard 174 may be provided to selectively cover the outlet 172 when the bottle 150 is not preparing to receive bulk material from the respective bulk material pack 124. The drip guard 174 may be displaced by the stage 132 to access the bottle 150. In some embodiments, the pump 168 may be protected during transport by having a stowed position with the pump at least partially recessed within the shell 160.

The bulk material packs 124 are configured to be disposable and easily removable from the compartments 122 of the raw material drawer 116. Therefore, when the reservoir 164 is empty, the entire bulk material pack 124 can be replaced. By integrating the pump 168 as part of the bulk material pack 124, cross contamination of ingredients is minimized or eliminated. Further, there is no need to flush and clean lines, which would be necessary if external, electric pumps were used. Nevertheless, if desired, the pump 168 alternatively may be provided as an element of the container 122, and the bulk material pack 124 may be configured to engage the pump 168 in substantially the configuration described above when the bulk material pack 124 is inserted into the container 122.

Figure 10A:
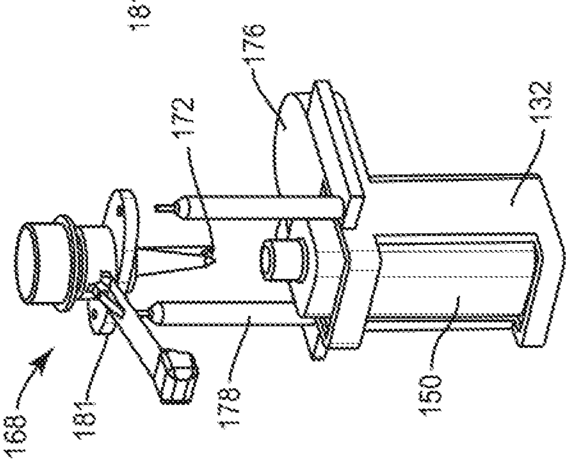

With reference to FIG. 8 and FIGS. 10A-10D, the bulk material filling station 126 is further described. The robot 130 may be actuated to present the stage 132 and the bottle 150 to a desired bulk material filling station 126, where the bottle is aligned below a corresponding pump 168 as shown in FIG. 10A. The stage 132 may include an RFID antenna 176 configured to read the RFID tag 166 on the bulk material pack 124 at the corresponding filling station 126 and verify the proper placement of the stage. The use of RFID may be optional. The controller 142 may be pre-programmed with coordinates for the stage 132 to correspond to each compartment 122. When stocking the dispenser unit 100, the user may then program the controller 142 with the user interface 102 to teach the dispenser unit 100 which bulk material is located within each compartment 122 or provided at each filling station 126.

Figure 10B:
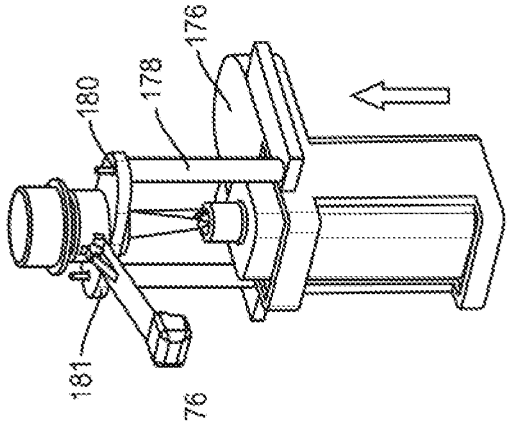
Figure 10C:
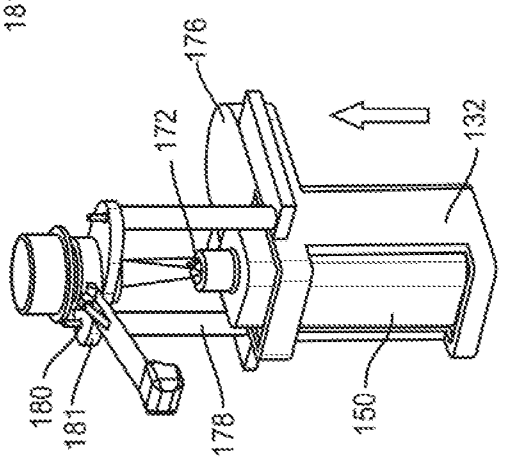
Figure 10D:
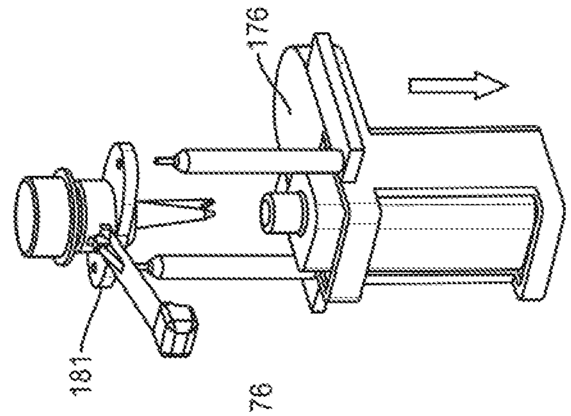

Once the robot 130 has positioned the bottle 150 at an appropriate filling station 126 for the preferred precursor recipe, the stage 132 may be raised vertically such that a portion of the stage engages with a portion of the pump 168 as shown in FIG. 10B. In other embodiments, the bottle 150 itself may engage a portion of the pump 168. In the illustrated embodiment, the stage 132 is shown with a pair of alignment posts 178 configured to contact a portion of the pump 168, such as engaging a pair of alignment apertures 180 formed in a flange 181 of the pump. Once the alignment posts 178 engage the alignment apertures 180, continued upward motion of the stage 132, as shown by the bold arrow in FIG. 100, presses upward upon the pump 168 to release bulk material from the outlet 172 and into the bottle 150. Activating the pump 168 may also be achieved by rotation cams.

Upon receiving an amount of bulk material, such as a measured dose from the staging chamber 170, the bottle 150 may be retracted, and disengage the pump 168. In some cases, the desired precursor may include multiple doses of bulk material from a single filling station 126. Therefore the stage 132 may retreat from the pump 168 by a sufficient extent to reload the pump without disengaging completely from the pump. The stage 132 may then press up again to extract an additional amount of the bulk material. When the bottle 150 has received the desired amount of bulk material from the current filling station 126, the stage 132 may disengage the pump 168 by moving the stage down along the Z axis, for example.

FIGS. 11 and 12 show the stage 132 and the bottle 150 stopped at a second filling station 126*b* and a third filling station 126*c* respectively. At the second filling station 126*b*, the bottle 150 may receive one or more doses of a flavor material. The flavor material may be released from the corresponding bulk material pack 124*b* in much the same way as described above. Similarly, at the third filling station 126*c*, the bottle 150 may receive one or more doses of a nicotine material. The nicotine material may be released from the corresponding bulk material pack 124*c* in much the same way as described above. The motion of the stage 132 and the bottle 150 from the first filling station 126*a* to the second filling station 126*b* and to the third filling station 126*c* is represented by bold arrows in the respective figures. One skilled in the art will appreciate this is motion is provided by the robot 130 as described above.

Upon visiting the appropriate filling stations 126, and receiving the allegedly appropriate amount of bulk material from each station, the robot 130 may bring the bottle 150 to a testing station 182. FIG. 13 shows the stage 132 positioning the bottle 150 at the testing station 182. The testing station 182 is shown in further detail in FIGS. 14A and 14B. The testing station 182 may include instruments that are combined with the capping station 154 in a module. The optional testing station 182 is configured to measure the amount of the aerosol precursor within the bottle 150. The testing station 182 provides a quality control function to ensure that the user is dispensed the correct volume of aerosol precursor. In one example, the dispenser unit 100 may be configured to provide no less than 15 ml.

In one embodiment, the testing station 182 has an ultrasonic distance meter 184. As represented in FIG. 14B, a beam 186 or wave is emitted from the meter 184 into the bottle 150. The beam 186 would then reflect off the surface 188 of the aerosol precursor composition and return to the meter 184. The ultrasonic distance meter 184, alone or in combination with the controller 142, is able to determine the distance traveled by the beam 186. This distance could then be compared to the preferred distance if the bottle 150 were filled to the desired level. If the beam 186 has traveled too far, i.e. the volume of aerosol precursor was outside an acceptable range, the bottle 150 may be returned to one or more of the filling stations 126 to receive additional bulk material. In another embodiment, if the bottle 150 has not been sufficiently filled, the container 120 may be disposed in a waste bin 112, as seen in FIG. 2, instead of being provided to the customer. Disposing of the insufficiently filled container 120 may be preferred because the testing station 182 may not be able to determine which of the aerosol precursor components was lacking in the finished composition that resulted in an insufficient total volume. In one embodiment, the robot 130 may bring the bottle 150 to the testing station 182 after visiting each filling station 126. Testing the volume of the bottle 150 after adding each ingredient individually, however, may increase the processing time of the dispenser unit 100 to an unacceptable duration.

Providing the testing station 182 to ensure volume control may be important depending upon the reliability of the pumps 168. The volume within the bottle 150 may also be insufficient if the bulk material packs 124 are kept in service until they are completely empty of bulk material, in which case one or more of the uses of the pack 124 when the reservoir 164 is nearly empty may result in only a partial dose from the outlet 172. The controller 142 may be configured to track the number of times a particular bulk material pack 124 has been activated to release a dose of bulk material. For example, using the RFID tag 166 and the RFID antenna 176 discussed above, the controller 142 may log the number of visits to a particular bulk material pack 124. With this tracking capability, the bulk material pack 124 can be taken out of service and designated for replacement before the quality of its performance is expected to degrade.

The testing station 182 has been described as including an ultrasonic distance meter 184. One skilled in the art will appreciate that the testing station 182 can provide the same or substantially similar functionality with other laser or optical distance meters, or other measurement technologies known in the art. A meter using a laser may be used to reliably enter and return through a narrow neck of the bottle 150. In another example, the stage 132 may be equipped with a mass scale. The mass scale would have a tare weight equal to the empty bottle 150 and may be able to sufficiently estimate the total volume of precursor. The scale may also be able to estimate the volume of each ingredient while being added, based on a change in mass of the bottle 150 at each filling station 126. The scale may be able to allow sufficient station by station monitoring to reduce or eliminate the need to waste the container 120 or provide a separate testing step at the end of the filling process.

FIG. 15 shows the bottle 150 returned to the capping station 154 after the volume of the bottle's contents are tested as the testing station 182. The bottle 150 may be moved to the capping station 154 if the contents have an acceptable volume. If the bottle 150 is set for disposal, the bottle may also be returned to the capping station 154 to contain the precursor within the container 120 within the waste bin 112. The capping station 154 would function to return the cap 152 onto the bottle 150. Putting the cap 152 onto the bottle 150 is expected to occur in much the same manner as the cap was removed from the bottle. The cap retainer 156 may simply rotate the opposite direction once the bottle 150 has been aligned with the cap 152. Additional features of the capping station 154 will become clear in view of the detailed discussion of the container construction provided below.

The dispenser unit 100 may further comprise a labeling station 190. FIG. 16 shows the container 120 having been moved from the capping station 154 to the labeling station 190. The labeling station 190 is not limited to use after the bottle 150 has been filled or the cap 152 is secured to the bottle. The labeling station 190 may be used immediately following retrieval of a container 120 from the bulk consumable pack 118. In other embodiments, necessary and optional marking or information may be pre-disposed on the containers 120 such that additional labeling at a labeling station 190 is unnecessary.

Information provided on the container 120 may include indicia providing branding or text in compliance with any government regulations. The text may indicate the recipe, specifically or generically, used for the precursor contained inside. The text or symbols may provide instructions for use of the container 120 or the precursor. Information may include a bar code, QR code, or the like, to be scanned during purchasing for inventory control, price determination, etc.

Collectively referred to as information, the content of the label, may be pre-disposed in whole or in part upon the container 120. The content may also be applied, in whole or in part by the labeling station 190. The information may be applied directly to the bottle 150 or the cap 152 of the container 120. The information may be provided on the container 120 via a web 192 or film, such as an adhesive backed film or direct thermal transfer label. The information may be provided on the web 192 before or after the web the applied to the container 120.

FIG. 17 shows the labeling station 190 in the form of a print head 194. The print head 194 may be biased, e.g. spring loaded, to maintain pressure on the container 120 as the container is moved past the print head. The container 120 may be moved past the print head 194 using the robot 130. The container 120 may be rotated as needed to facilitate adhering a pre-printed label thereon and/or to facilitate printing on multiple surfaces of the container.

Turning to FIG. 18, prior to finishing the product (e.g. a container filled with precursor), one or more additional steps may occur within the dispenser unit 100. For example, the aerosol formers and the flavor materials often used to create the precursor of the present disclosure do not necessarily mix easily simply by being added into the same bottle 150. To provide a consistent product, however, these precursor components should be sufficiently mixed prior to use. One option is to provide the label with instructions that prompt the user to, "shake well", for example. In the embodiment shown in FIG. 18, a mixing step occurs within the dispenser unit 100. FIG. 18 shows a schematic cut-away top view of the dispenser unit 100. A mixing path 196 is shown in the form of a spiral pattern. The robot 130 may be configured to move the container 120 along the spiral mixing path within the X-Y plane. Alternatively or additionally, the mixing path 196 may be a pseudo random pattern. Alternatively or additionally, the stage 132 may be configured to move the container 120 along the Z-axis, out of the X-Y plane. Motion along the Z-axis is the same direction of motion that may be used to engage and disengaged with the capping station 154. Moving the container 120 along the Z-axis may occur relatively slowly as the container follows the spiral mixing path 196. Alternatively, the container 120 may be aggressively shaken up and down. Additionally or alternatively, the stage 132 may be configured to impart rotational motion to the container 120 about an axis, e.g. the Z-axis, passing through the container. In still other embodiments, rotational mixing may occur within the capping station 154. The cap retainer 156 may rotate the container 120 as a whole, where the bottle 150 has been temporarily released from the stage 132 or at least allowed to freely rotate with respect to the stage 132.

Turning to FIG. 19, an exemplary discharge chute 110 is illustrated. The discharge chute 110 may include an inlet 200. The robot 130 may be configured to position the container 120 within the inlet 200. The stage 132 or other structure may be used to raise the container 120. A deflection surface 202 may push the container 120 along a desired discharge path 204. Upon release from the stage 132 the discharge chute 110 may lead the container 120 to and/or out of the opening 104 in the access door 106.

Having described the dispenser unit 100, several possible stations within the dispenser unit 100 and a representative function of each, the methods and processes resulting from the use of the dispenser unit 100 are understood by one of ordinary skill in the art. Use of the dispenser unit 100 may be described as an automated method of making a custom composition of an aerosol precursor. The method may include retrieving an empty container 120 with a robot 130. The method may then include dispensing, at a first location, a liquid aerosol former into the container 120 with a first pump 168, moving the container 120 to a second location with the robot 130, and dispensing at least one liquid flavor material into the container 120 at the second location with a second pump. The container 120 may be sealed or closed with a cap 152. The aerosol precursor components may then be mixed to complete the aerosol precursor composition, which is then discharged from the dispenser unit 100.

Turning to FIGS. 20-23, one example of a container 120 for use with the dispenser unit 100 is shown in detail. In an embodiment, the container 120 dispensed by the dispenser unit 100 will have one or more "child resistant" features. "Child resistant" features are generally understood by one of ordinary skill in the art to require a combination of two or more different actions in order to limit access to the contents of the container 120. An example includes applying a squeezing action while rotating the cap 152. Other traditional child resistant caps require a pressing force while rotating. Yet other conventional child resistant caps require alignment of certain elements prior to removal of the cap.

In an embodiment, the container 120 includes one or more tamper evident features. A tamper evident feature is intended to alter the appearance or function of the container 120 after it is initially accessed, so that a user is aware if the container has been previously opened. For example, several bottle caps have buttons that pop up after the container is initially breached. In a preferred embodiment, the container 120 with aerosol precursor that is received from the dispenser unit 100 will have both child resistant and tamper evident features.

FIG. 20 shows a cross section of the container 120 in a first state. The first state generally corresponds with a pre-filled state (i.e., prior to, or before, being filled and thus being substantially empty or unfilled). The container 120 in the first state may reside in the bulk consumable pack 118, ready for retrieval by the robot 130. The container 120 includes the bottle 150 and the cap 152. The bottle 150 includes a storage volume 210 for holding liquid contents, such as the aerosol precursor. The storage volume 210 may be at least about 5 ml, and preferably at least about 15 ml. Because the dispenser unit 100 is preferably configured as a counter-top device having a significant number of containers 120 inside, the storage volume 210 is not expected to exceed 100 ml. In many instances, the storage volume 210 is large enough to contain sufficient aerosol precursor for more than one use in an aerosol delivery device. In other words, the reservoir of the aerosol delivery device, as provided within a cartridge for example, may be two or more times smaller than the storage volume 210 of the bottle 150.

The bottle 150 may include a neck 212 with external threads 214 that at least partially assist with attachment of the cap 152 to the bottle 150. Between the threads 214 and the storage volume 210, the neck 212 may include a radial flange 216.

The cap 152 may include a nozzle 220 with an aperture 222 for dispensing the aerosol precursor from the storage volume 210. The nozzle 220 may at least partially fit within the neck 212. The cap 152 may also include an inner cover 224. The inner cover 224 may include internal threads 226 configured for engagement with the external threads 214 of the neck 212. The inner cover 224 may provide a tamper evident feature in the form of a tamper evident band 228 positioned within an interior of the inner cover 224.

In the first, pre-filled position, the tamper evident band 228 is not activated. Therefore, removal of the cap 152 to allow for filling the bottle 150 with precursor will not result in destruction of the tamper evident band 228. As shown in FIG. 20, the tamper evident band 228 may press against a top of the radial flange 216 in the first state. This press fit between the band 228 and the top of the radial flange 216 may help ensure that the cap 152 does not become loose from the bottle 150 during shipping or loading of the empty containers 120.

The cap 152 may also include an outer cover 230 configured to be provided over the inner cover 224. Selected movement between the inner cover 224 and the outer cover 230 may provide the container 120 with the preferred child resistant feature. For example, the outer cover 230 may require being squeezed radially against the inner cover 224 in order for the inner cover 224 to be rotated relative to the neck 212. Alternatively, the outer cover 230 may require being pressed down toward the bottle 150 onto the inner cover 224 in order for the inner cover to be rotated relative to the neck 212.

The first state, shown in FIG. 20, includes the cap 152 partially attached to the bottle 150. For example, the nozzle 220 is inserted into the neck 212 by a first insertion distance I1. The inner cover 224 is threadingly engaged with the neck 212 by a first thread distance T1. In the first state, the cap 152 can be completely removed from the bottle 150 without triggering the tamper evident features, so that the bottle 150 can receive the aerosol precursor composition components. Complete removal of the cap 152 prior to filling may include simultaneously removing the nozzle 220, inner cover 224 and outer cover 230.

FIG. 21 shows the cap 152 completely attached to the bottle 150 in a second state. The second state generally occurs after the aerosol precursor has filled the bottle 150. FIG. 21 shows the tamper evident band 228 intact and activated as it would occur before the user has used the aerosol precursor for the first time. In a second state, the cap 152 is engaged with the bottle 150 such that the nozzle 220 is inserted into the neck 212 by a second insertion distance I2, lbeing greater than I1. In the second state, the inner cover 224 is threadingly engaged with the neck 212 by a second thread distance T2, T2 being greater than T1. When the inner cover 224 is fully threaded onto the neck 212, the tamper evident band 228 is activated by being positioned below the radial flange 216. With the band 228 activated, when the inner cover 224 is removed from the nozzle 220, the band is damaged (e.g. permanent deformed or broken off) as the band passes the radial flange 216.

In the first state, shown in FIG. 20, the first insertion distance I1 is configured to provide a loose fit for the nozzle 220 within the neck 212. When the inner cover 224 is threadingly removed from the neck 212 to access the bottle 150 for filling, the nozzle 220 is carried with the inner cover 224 and maintained with the cap 152. In one example, the nozzle 220 has a detent 232 to snap fit into the inner cover 224 by interacting with a projection 234. The detent 232 and the projection 234 allow the nozzle 220 to follow the inner cover 224 when the nozzle is only loosely inserted into the neck 212. In other words, the detent 232 enables the cap 152, when in the first state, to be entirely removed from the bottle 150 in a single step at the capping station 154. This eliminates the requirement that the nozzle 220 be separately removed from the bottle 150 or separately added to the bottle as the case may be.

In the second state, shown in FIG. 21, however, the second insertion distance I2 is configured to provide a tight, substantially permanent press fit of the nozzle 220 into the neck 212. The nozzle 220 may include a shoulder 236 set below a step 238 of the inner cover 224. As the inner cover 224 is fully threaded onto the neck 212, the step 238 of the inner cover 224 may press upon the shoulder 236 of the nozzle 220, forcing the nozzle to the second insertion distance I2. In the second position, the hold between the neck 212 and the nozzle 220 is significantly greater than the hold between the detent 232 and the projection 234. Therefore, once the second state is achieved, the inner cover 224 is configured to be threadingly removable from the bottle 150 while the nozzle 220 remains engaged with the neck 212.

When the nozzle 220 is inserted into the neck 212 by the second insertion distance I2, and the inner cover 224 is not threadingly engaged with the neck, the container 120 may be said to be in a third state. In the third state, the precursor contents of the bottle 150 can be dispensed through the aperture 222 of the nozzle 220.

In some embodiments, the side walls 240 of the bottle 150 and the side walls 242 of the cap 152 may not be cylindrical. As such, threading the cap 152 relative to the bottle 150 may create instances of miss-alignment between the side walls 242 of the cap 152 and the side walls 240 of the bottle 150. To address this potential issue, and help ensure that alignment of the respective side walls when the cap 152 is fully threaded onto the bottle 150, the neck 212 may be provided with a bottle alignment stop 244. The bottle alignment stop 244 may be best seen in FIG. 22. The inner cover 224 may also have a cap alignment stop 246, which may be best seen in FIG. 23. When threading the cap 152 onto the bottle 150, the bottle alignment stop 244 will abut the cap alignment stop 246 in the second state, as which time the side walls 240, 242 of the container 120 will be in alignment.

Having shown and described the structure of a container 120 according to one embodiment, methods and processes for using or filling the container will be apparent to one of ordinary skill in the art. In one example, the container 120 may be used as part of a method of filling a container with an aerosol precursor liquid. The method may include separating a cap 152 from a bottle 150 with a machine, where the cap has a nozzle 220, an inner cover 224 and an outer cover 230. The method may then include at least partially filling a storage volume 210 of the bottle 150 with the aerosol precursor liquid from a plurality of filling stations 126, each station comprising a liquid component of the aerosol precursor. The method may continue by attaching the cap 152 to the bottle 150 such that the nozzle 220 is substantially permanently fixed to the bottle and a tamper evident band 228 formed with the inner cover 224 is activated below a radial flange 216 extending from the neck 212 of the bottle.

The foregoing description of use of the dispenser unit 100 and the container 120 can be applied to the various embodiments described herein through minor modifications, which can be apparent to the person of skill in the art in light of the further disclosure provided herein. The above description of use, however, is not intended to limit the use of the article but is provided to comply with all necessary requirements of disclosure of the present disclosure.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A child resistant, tamper evident container, the container comprising:

a bottle having a storage volume for holding liquid contents; and a cap assembly attached to the bottle in a first assembled state, the cap assembly comprising:

a nozzle at least partially received within the bottle;

an inner cover provided over the nozzle and comprising a tamper evident band, the inner cover threadingly engaged with the bottle; and an outer cover provided over the inner cover, wherein the outer cover creates a child resistant feature limiting an ability to remove the inner cover from the bottle, wherein, in the first assembled state, the nozzle, inner cover, and outer cover are simultaneously removable from the bottle without triggering the tamper evident band, and in a second assembled state, the nozzle is substantially permanently fixed to the bottle, wherein the bottle comprises a neck and a radial flange and the cap assembly is secured to the bottle via a press-fit between the tamper evident band and the radial flange in the first assembled state.

2. The container of claim 1, wherein:

the bottle has a neck comprising external threads;

the nozzle is configured to at least partially fit within the neck, and the nozzle has an aperture for dispensing the liquid contents from the bottle; and the inner cover further comprises internal threads for engagement with the external threads of the neck, wherein the tamper evident band is positioned within an interior of the inner cover.

3. The container of claim 2, wherein, in the first assembled state, the cap assembly is engaged with the bottle such that the nozzle is inserted into the neck by a first insertion distance I1, and the inner cover is threadingly engaged with the neck by a first thread distance T1;

in the assembled second state, the cap assembly is engaged with the bottle such that the nozzle is inserted into the neck by a second insertion distance I2, I2 being greater than I1, and the inner cover is threadingly engaged with the neck by a second thread distance T2, T2 being greater than T1; and in a third assembled state, the nozzle is inserted into the neck by the second insertion distance I2, and the inner cover is not threadingly engaged with the neck such that the liquid contents of the bottle can be dispensed through the aperture of the nozzle.

4. The container of claim 1, wherein the tamper evident band is activated by being positioned below the radial flange in the second assembled state.

5. The container of claim 1, wherein the inner cover is secured to the nozzle in the first assembled state.

6. The container of claim 5, wherein the inner cover is secured to the nozzle via a snap-fit in the first assembled state.

7. The container of claim 1, wherein the nozzle comprises a detent disposed at least partially about an outer surface of the nozzle and the inner cover comprises a projection at least partially disposed about an inner surface of the inner cover and configured to engage with the detent to prevent separation of the nozzle and the inner cover in the first assembled state.

8. A method of filling a container with an aerosol precursor, comprising:

retrieving a container comprising a bottle and a pre-attached cap assembly, the cap assembly comprising a nozzle at least partially received within the bottle, an inner cover provided over the nozzle and comprising a tamper evident band, the inner cover threadingly engaged with the bottle, and an outer cover provided over the inner cover;

separating the pre-attached cap assembly from the bottle with a machine without triggering the tamper evident band;

at least partially filling a storage volume of the bottle with the aerosol precursor from a plurality of filling stations, each station comprising a liquid component of the aerosol precursor;

reattaching the cap assembly to the bottle such that the nozzle is substantially permanently fixed to the bottle and the tamper evident band formed with the inner cover is activated below a radial flange extending from a neck of the bottle.

9. The method of claim 8, wherein separating the cap assembly from the bottle comprises simultaneously removing the nozzle, the inner cover, and the outer cover from the bottle.

10. The method of claim 8, wherein separating the pre-attached cap assembly from the bottle comprises rotating the cap assembly relative to the bottle.

11. The method of claim 8, wherein retrieving the container comprises using a robot to retrieve the container from a bulk consumable pack.

* * * * *